(12) United States Patent
Takagi et al.

(10) Patent No.: US 11,940,012 B2
(45) Date of Patent: **\*Mar. 26, 2024**

(54) CLUTCH DEVICE

(71) Applicant: DENSO CORPORATION, Kariya (JP)

(72) Inventors: Akira Takagi, Kariya (JP); Ryo Ishibashi, Kariya (JP); Takumi Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 689 days.

This patent is subject to a terminal disclaimer.

(21) Appl. No.: 17/137,726

(22) Filed: Dec. 30, 2020

(65) Prior Publication Data

US 2021/0115979 A1  Apr. 22, 2021

Related U.S. Application Data

(63) Continuation of application No. PCT/JP2019/026689, filed on Jul. 4, 2019.

(30) Foreign Application Priority Data

Jul. 6, 2018  (JP) .................................. 2018-128691
Jun. 6, 2019  (JP) .................................. 2019-106249

(51) Int. Cl.
*F16D 13/52*   (2006.01)
*F16D 23/12*   (2006.01)
(Continued)

(52) U.S. Cl.
CPC ............. *F16D 13/52* (2013.01); *F16D 23/12* (2013.01); *F16H 25/12* (2013.01); *F16D 2023/123* (2013.01); *F16D 28/00* (2013.01)

(58) Field of Classification Search
CPC .......... F16D 13/52; F16D 13/58; F16D 28/00; F16D 2023/123
See application file for complete search history.

(56) References Cited

U.S. PATENT DOCUMENTS

| 4,918,347 | A |   | 4/1990 | Takaba |
| 5,106,349 | A | * | 4/1992 | Botterill ................ F16D 43/216 74/567 |

(Continued)

FOREIGN PATENT DOCUMENTS

| JP | 11-270654 | 10/1999 |
| JP | 2009-108973 | 5/2009 |

OTHER PUBLICATIONS

U.S. Appl. No. 17/137,725, filed Dec. 30, 2020, Clutch Device.
(Continued)

*Primary Examiner* — Huan Le
(74) *Attorney, Agent, or Firm* — Nixon & Vanderhye P.C.

(57) ABSTRACT

A normal-time drive cam groove extends from a drive cam specific point, which is defined as a specific point of the drive cam, toward one side in a circumferential direction of the drive cam. A groove bottom at the normal-time drive cam groove is sloped relative to one end surface of the drive cam such that a depth of the groove bottom continuously decreases from the drive cam specific point toward the one side in the circumferential direction of the drive cam. An emergency-time drive cam groove extends from the drive cam specific point toward another side in the circumferential direction of the drive cam.

6 Claims, 13 Drawing Sheets

(51) Int. Cl.
  *F16H 25/12*  (2006.01)
  *F16D 28/00*  (2006.01)

(56) References Cited

U.S. PATENT DOCUMENTS

| | | | |
|---|---|---|---|
| 10,473,168 B2 * | 11/2019 | Nahrwold | F16H 63/30 |
| 10,704,612 B2 * | 7/2020 | Hirota | F16D 27/115 |
| 2002/0194941 A1 | 12/2002 | Hulsebusch et al. | |
| 2003/0199359 A1 | 10/2003 | Tucker-Peake | |
| 2014/0077641 A1 | 3/2014 | Ratte et al. | |
| 2016/0238107 A1 | 8/2016 | Hirota et al. | |
| 2018/0238402 A1 | 8/2018 | Saito et al. | |
| 2021/0115980 A1 * | 4/2021 | Sugiura | F16D 13/52 |

OTHER PUBLICATIONS

U.S. Appl. No. 17/137,726, filed Dec. 30, 2020, Clutch Device.
U.S. Appl. No. 17/137,727, filed Dec. 30, 2020, Rolling Element Cam and Clutch Device Using Same.
U.S. Appl. No. 17/137,730, filed Dec. 30, 2020, Clutch Device.
U.S. Appl. No. 17/137,725, to Sugiura, et al., entitled "Clutch Device", filed Dec. 30, 2020 (55 pages).
U.S. Appl. No. 17/137,727, to Sugiura, et al., entitled "Rolling Element Cam and Clutch Device Using Same", filed Dec. 30, 2020 (70 pages).
U.S. Appl. No. 17/137,730, to Ishibashi, et al., entitled "Clutch Device", filed Dec. 30, 2020 (47 pages).

* cited by examiner

FIG. 2
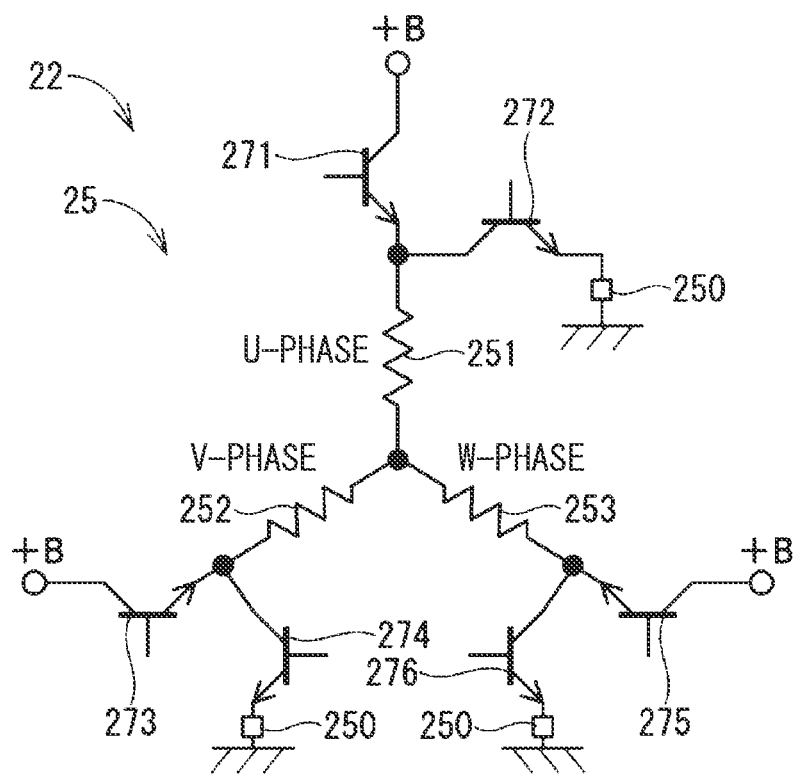
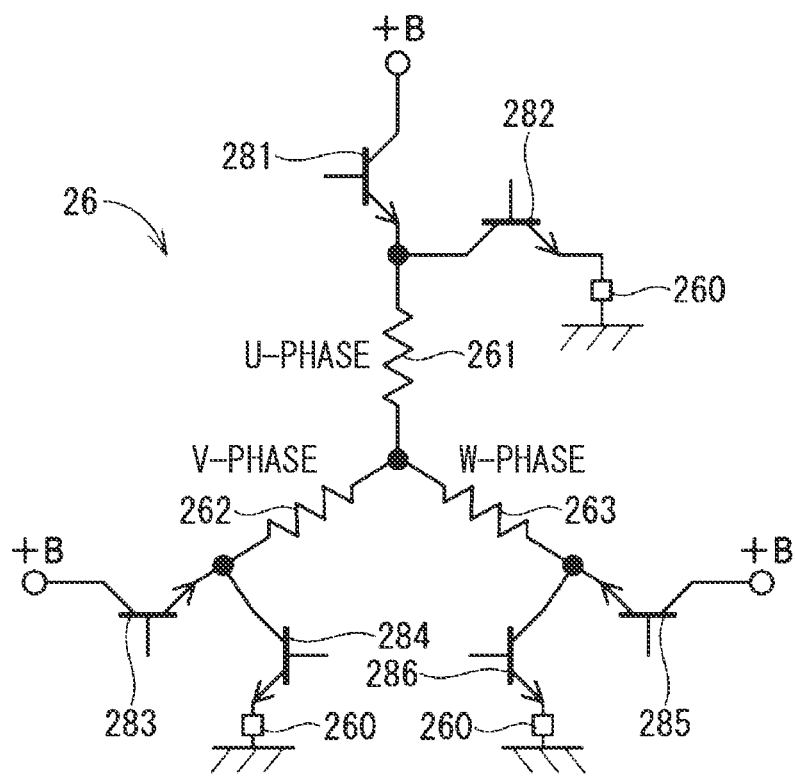

CLUTCH DEVICE

CROSS REFERENCE TO RELATED APPLICATIONS

This application is a continuation application of International Patent Application No. PCT/JP2019/026689 filed on Jul. 4, 2019, which designated the U.S. and claims the benefit of priority from Japanese Patent Application No. 2018-128691 filed on Jul. 6, 2018 and Japanese Patent Application No. 2019-106249 filed on Jun. 6, 2019. The entire disclosures of all of the above applications are incorporated herein by reference.

TECHNICAL FIELD

The present disclosure relates to a clutch device.

BACKGROUND

Previously, there has been proposed a rolling element cam, in which a drive cam is rotated by torque of rotation outputted from a drive device while a speed of the rotation outputted from the drive device is reduced through a speed reducer before transmission of the rotation to the drive cam. When the drive cam is rotated, a rolling element is rolled along a cam groove of the drive cam and a cam groove of a driven cam to move the driven cam in an axial direction relative to the drive cam.

Furthermore, there has been proposed a clutch device that includes the rolling element cam and a clutch while the clutch is configured to shift its operational state to a coupled state or a decoupled state depending on a relative position of the driven cam relative to the drive cam in the axial direction to enable or disable transmission of the torque between a first transmitter and a second transmitter through the clutch. For example, the above rolling element cam can be applied to the clutch device to enable shifting of the operational state of the clutch to the coupled state or the decoupled state.

SUMMARY

This section provides a general summary of the disclosure, and is not a comprehensive disclosure of its full scope or all of its features.

According to the present disclosure, there is provided a clutch device that includes a first transmitter, a drive device, a drive cam, a plurality of rolling elements, a driven cam, a second transmitter and a clutch. The drive device includes two winding sets and is configured to output torque through energization of the two winding sets. The drive cam has a plurality of drive cam grooves formed at one end surface of the drive cam. The drive cam is configured to be rotated by the torque outputted from the drive device. Each of the plurality of rolling elements is rotatably installed in a corresponding one of the plurality of drive cam grooves. The driven cam has a plurality of driven cam grooves formed at one end surface of the driven cam while each of the plurality of rolling elements is clamped between a corresponding one of the plurality of drive cam grooves and a corresponding one of the plurality of driven cam grooves. The driven cam cooperates with the drive cam and the plurality of rolling elements to form a rolling element cam. When relative rotation is made between the driven cam and the drive cam, the driven cam is moved relative to the drive cam in an axial direction. The second transmitter is configured to transmit the torque between the first transmitter and the second transmitter. The clutch is configured to shift an operational state of the clutch to a coupled state or a decoupled state depending on a relative position of the driven cam relative to the drive cam in the axial direction, wherein the clutch is configured to enable transmission of the torque between the first transmitter and the second transmitter through the clutch in the coupled state and disable the transmission of the torque between the first transmitter and the second transmitter through the clutch in the decoupled state

BRIEF DESCRIPTION OF DRAWINGS

The drawings described herein are for illustrative purposes only of selected embodiments and not all possible implementations, and are not intended to limit the scope of the present disclosure.

FIG. 2 is a schematic diagram indicating winding sets of a drive device of a clutch device according to the first embodiment.

DETAILED DESCRIPTION

Figure 1:
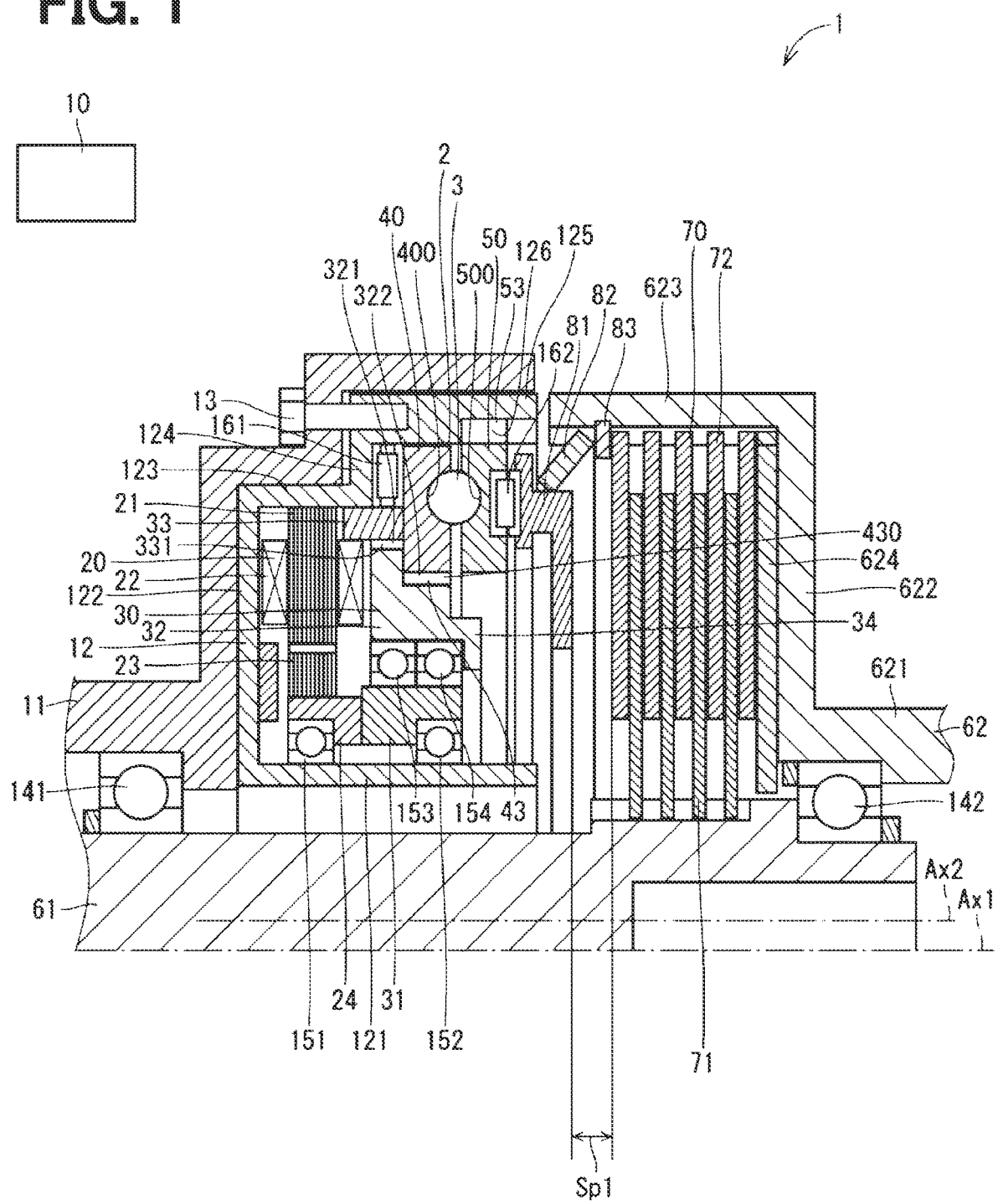
FIG. 1 is a cross-sectional view of a clutch device according to a first embodiment.

Previously, there has been proposed a rolling element cam, in which a drive cam is rotated by torque of rotation outputted from a drive device while a speed of the rotation outputted from the drive device is reduced through a speed reducer before transmission of the rotation to the drive cam. When the drive cam is rotated, a rolling element is rolled along a cam groove of the drive cam and a cam groove of a driven cam to move the driven cam in an axial direction relative to the drive cam.

Furthermore, there has been proposed a clutch device that includes the rolling element cam and a clutch while the clutch is configured to shift its operational state to a coupled state or a decoupled state depending on a relative position of the driven cam relative to the drive cam in the axial direction to enable or disable transmission of the torque between a first transmitter and a second transmitter through the clutch. For example, the previously proposed rolling element cam discussed above can be applied to the clutch device to enable shifting of the operational state of the clutch to the coupled state or the decoupled state.

In the clutch device, in which the above rolling element cam is applied, in a case where a winding set of the drive device is broken, torque of the drive device is lost. Thus, in such a case, the drive cam cannot be rotated, and thereby the shifting of the operational state of the clutch is disabled.

According to the present disclosure, there is provided a clutch device that includes a first transmitter, a drive device, a drive cam, a plurality of rolling elements, a driven cam, a second transmitter and a clutch.

The drive device includes two winding sets and is configured to output torque through energization of the two winding sets. The drive cam has a plurality of drive cam grooves formed at one end surface of the drive cam. The drive cam is configured to be rotated by the torque outputted from the drive device. Each of the plurality of rolling elements is rotatably installed in a corresponding one of the plurality of drive cam grooves. The driven cam has a plurality of driven cam grooves formed at one end surface of the driven cam while each of the plurality of rolling elements is clamped between a corresponding one of the plurality of drive cam grooves and a corresponding one of the plurality of driven cam grooves. The driven cam cooperates with the drive cam and the plurality of rolling elements to form a rolling element cam. When relative rotation is made between the driven cam and the drive cam, the driven cam is moved relative to the drive cam in an axial direction. The second transmitter is configured to transmit the torque between the first transmitter and the second transmitter. The clutch is configured to shift an operational state of the clutch to a coupled state or a decoupled state depending on a relative position of the driven cam relative to the drive cam in the axial direction. The clutch is configured to enable transmission of the torque between the first transmitter and the second transmitter through the clutch in the coupled state and disable the transmission of the torque between the first transmitter and the second transmitter through the clutch in the decoupled state.

Each of the plurality of drive cam grooves includes a normal-time drive cam groove and an emergency-time drive cam groove. The normal-time drive cam groove extends from a corresponding drive cam specific point, which is defined as a specific point of the drive cam, toward one side in a circumferential direction of the drive cam. A groove bottom at the normal-time drive cam groove is sloped relative to the one end surface of the drive cam such that a depth of the groove bottom continuously decreases from the corresponding drive cam specific point toward the one side in the circumferential direction of the drive cam. The emergency-time drive cam groove extends from the corresponding drive cam specific point toward another side in the circumferential direction of the drive cam. The groove bottom at the emergency-time drive cam groove is sloped relative to the one end surface of the drive cam such that the depth of the groove bottom continuously decreases from the corresponding drive cam specific point toward the another side in the circumferential direction of the drive cam. A slope angle of the groove bottom of each of the plurality of drive cam grooves relative to the one end surface of the drive cam is set such that the slope angle of the groove bottom at the emergency-time drive cam groove is smaller than the slope angle of the groove bottom at the normal-time drive cam groove.

Each of the plurality of driven cam grooves includes a normal-time driven cam groove and an emergency-time driven cam groove. The normal-time driven cam groove extends from a corresponding driven cam specific point, which is defined as a specific point of the driven cam, toward one side in a circumferential direction of the driven cam. A groove bottom at the normal-time driven cam groove is sloped relative to the one end surface of the driven cam such that a depth of the groove bottom continuously decreases from the corresponding driven cam specific point toward the one side in the circumferential direction of the driven cam. The emergency-time driven cam groove extends from the corresponding driven cam specific point toward another side in the circumferential direction of the driven cam. The groove bottom at the emergency-time driven cam groove is sloped relative to the one end surface of the driven cam such that the depth of the groove bottom continuously decreases from the corresponding driven cam specific point toward the another side in the circumferential direction of the driven cam. A slope angle of the groove bottom of each of the plurality of driven cam grooves relative to the one end surface of the driven cam is set such that the slope angle of the groove bottom at the emergency-time driven cam groove is smaller than the slope angle of the groove bottom at the normal-time driven cam groove.

In the present disclosure, in a case where one winding set among the two winding sets of the drive device is broken, the other remaining winding set can be energized to output the torque from the drive device to rotate the drive cam. As a result, even when the winding set of the drive device is broken, the operation of the clutch device can be continued.

Here, in the case where the one winding set among the two winding sets of the drive device is broken, the torque outputted from the electric motor is reduced in comparison to the torque outputted from the drive device before the time of occurrence of the breakage of the one winding set among the two winding sets. In view of this point, in the present disclosure, the slope angle of the groove bottom at the emergency-time drive cam groove and the slope angle of the groove bottom at the emergency-time driven cam groove are set to be smaller than the slope angle of the groove bottom at the normal-time drive cam groove and the slope angle of the groove bottom at the normal-time driven cam groove, respectively. Thereby, when each rolling element is rolled along the corresponding emergency-time drive cam groove and the corresponding emergency-time driven cam groove, the drive cam can be rotated with a small torque. Thus, at the normal time, during which none of the two winding sets is broken, the operation of the drive device is controlled such that each rolling element is rolled along the corresponding normal-time drive cam groove and the corresponding normal-time driven cam groove. Furthermore, at the emergency time, during which the one winding set among the two winding sets is broken, the operation of the drive device is controlled such that each rolling element is rolled along the corresponding emergency-time drive cam groove and the corresponding emergency-time driven cam groove, so that the operation of the clutch device can be reliably continued.

Hereinafter, a clutch device according to a plurality of embodiments will be described with reference to the drawings. In addition, in the following embodiments, the substantially same components are denoted by the same reference signs, and the description thereof will be omitted.

Furthermore, in the following embodiments, substantially the same constituent parts have the same or similar action and effect.

First Embodiment

FIG. 1 indicates a clutch device according to a first embodiment. The clutch device 1 is installed, for example, between an internal combustion engine and a transmission at a vehicle and is used to enable or disable transmission of torque between the internal combustion engine and the transmission.

The clutch device 1 includes: an electronic control unit (hereinafter referred to as an ECU) 10, which serves as a controller; an input shaft 61, which serves as a first transmitter; an electric motor 20, which serves as a drive device; a speed reducer 30; a housing 12; a drive cam 40; a plurality of balls 3; a driven cam 50; an output shaft 62, which serves as a second transmitter; a clutch 70; and a piston 81, which serves as a state shifter.

The ECU 10 is a microcomputer that includes: a CPU, which serves as an arithmetic unit; a ROM, a RAM and an EEPROM, which serve as a storage unit; and an I/O device, which serves as an input/output unit. The ECU 10 controls various devices and instruments of the vehicle by executing various computing operations according to a program stored in the ROM or the like based on information such as signals from various sensors provided in corresponding parts of the vehicle. As described above, the ECU 10 executes the program stored in the non-transitory computer-readable storage medium. By executing this program, a method corresponding to the program is executed.

The ECU 10 can control the operation of, for example, the internal combustion engine based on the information such as signals from the various sensors. Further, the ECU 10 can control the operation of the electric motor 20 described later.

The input shaft 61 is connected to, for example, a drive shaft of the internal combustion engine (not shown) and can be rotate together with the drive shaft. That is, torque is input to the input shaft 61 from the drive shaft.

A stationary flange 11 is installed to the vehicle that has the internal combustion engine. The stationary flange 11 is shaped in a tubular form and is fixed to, for example, an engine room of the vehicle. A bearing 141 is installed between an inner peripheral wall of the stationary flange 11 and an outer peripheral wall of the input shaft 61. Therefore, the input shaft 61 is rotatably supported by the stationary flange 11 through the bearing 141.

The housing 12 is placed between an inner peripheral wall of an end part of the stationary flange 11 and the outer peripheral wall of the input shaft 61. The housing 12 includes: an inner tubular portion 121; an inner bottom portion 122; an outer tubular portion 123; an outer bottom portion 124, which serves as a bottom portion; an outer tubular portion 125, which serves as a tubular portion; and a plurality of spline grooves 126.

The inner tubular portion 121 is shaped generally in a cylindrical tubular form. The inner bottom portion 122 is formed integrally with the inner tubular portion 121 in one-piece such that the inner bottom portion 122 is shaped in a ring plate form and radially outwardly extends from an end part of the inner tubular portion 121. The outer tubular portion 123 is formed integrally with the inner bottom portion 122 in one-piece such that the outer tubular portion 123 is shaped generally in a cylindrical tubular form and extends from an outer peripheral part of the inner bottom portion 122 toward the outer bottom portion 124. The outer bottom portion 124 is formed integrally with the outer tubular portion 123 in one-piece such that the outer bottom portion 124 is shaped in a ring plate form and radially outwardly extends from an end part of the outer tubular portion 123, which is opposite to the inner bottom portion 122. The outer tubular portion 125 is formed integrally with the outer bottom portion 124 such that the outer tubular portion 125 is shaped generally in a cylindrical tubular form and extends from an outer peripheral part of the outer bottom portion 124 toward a side that is opposite to the outer tubular portion 123. The spline grooves 126 are formed at an inner peripheral wall of an end part of the outer tubular portion 125, which is opposite to the outer bottom portion 124. The spline grooves 126 are arranged one after another in a circumferential direction of the outer tubular portion 125 and extend from an end part of the outer tubular portion 125 toward the outer bottom portion 124.

The housing 12 is installed to the stationary flange 11 such that an outer peripheral wall of the outer tubular portion 123 and an outer peripheral wall of the outer tubular portion 125 are opposed to an inner peripheral wall of an end part of the stationary flange 11. The housing 12 is fixed to the stationary flange 11 by bolts 13. Here, the housing 12 is coaxial with the stationary flange 11 and the input shaft 61. A space, which is shaped generally in a cylindrical tubular form, is formed between an inner peripheral wall of the inner tubular portion 121 and the outer peripheral wall of the input shaft 61.

The electric motor 20 includes a stator 21, a coil 22, a rotor 23 and a shaft 24. The stator 21 is formed by, for example, laminated steel plates and is shaped generally in a circular ring form, and the stator 21 is fixed to an inside of the outer tubular portion 123. Specifically, the stator 21 of the electric motor 20 is installed to the outer tubular portion 123 of the housing 12 such that the stator 21 is not movable relative to the outer tubular portion 123. The coil 22 is wound around the stator 21. The rotor 23 is formed by, for example, laminated steel plates and is shaped generally in a circular ring form, and the rotor 23 is placed at an inside of the stator 21 such that the rotor 23 is rotatable relative to the stator 21. The shaft 24 is shaped generally in a cylindrical tubular form, and the shaft 24 is installed to an inside of the rotor 23 and is integrated with the rotor 23. The shaft 24 is located on a radially outer side of the inner tubular portion 121 of the housing 12. A bearing 151 is installed between an inner peripheral wall of the shaft 24 and an outer peripheral wall of the inner tubular portion 121. In this way, the rotor 23 and the shaft 24 are rotatably supported by the inner tubular portion 121 through the bearing 151.

Here, the coil 22 has two winding sets 25, 26 (see FIG. 2). The winding set 25 includes a U-phase winding 251, a V-phase winding 252 and a W-phase winding 253. The U-phase winding 251, the V-phase winding 252 and the W-phase winding 253 are respectively wound around the stator 21, and one end of the U-phase winding 251, one end of the V-phase winding 252 and one end of the W-phase winding 253 are electrically connected with each other.

The other winding set 26 includes a U-phase winding 261, a V-phase winding 262 and a W-phase winding 263. The U-phase winding 261, the V-phase winding 262 and the W-phase winding 263 are respectively wound around the stator 21, and one end of the U-phase winding 261, one end of the V-phase winding 262 and one end of the W-phase winding 263 are electrically connected with each other.

The ECU 10 has switching devices 271-276, 281-286 and voltage sensors 250, 260.

One end of the switching device 271 is connected to a positive electrode of a battery (not shown), and the other end of the switching device 271 is connected to one end of the switching device 272. The other end of the switching device 272 is connected to a ground. One end of the switching device 273 is connected to the positive electrode of the battery (not shown), and the other end of the switching device 273 is connected to one end of the switching device 274. The other end of the switching device 274 is connected to the ground. One end of the switching device 275 is connected to the positive electrode of the battery (not shown), and the other end of the switching device 275 is connected to one end of the switching device 276. The other end of the switching device 276 is connected to the ground.

One end of the switching device 281 is connected to the positive electrode of the battery (not shown), and the other end of the switching device 281 is connected to one end of the switching device 282. The other end of the switching device 282 is connected to the ground. One end of the switching device 283 is connected to the positive electrode of the battery (not shown), and the other end of the switching device 283 is connected to one end of the switching device 284. The other end of the switching device 284 is connected to the ground. One end of the switching device 285 is connected to the positive electrode of the battery (not shown), and the other end of the switching device 285 is connected to one end of the switching device 286. The other end of the switching device 286 is connected to the ground.

The other end of the U-phase winding 251 is connected to a connection between the switching device 271 and the switching device 272. The other end of the V-phase winding 252 is connected to a connection between the switching device 273 and the switching device 274. The other end of the W-phase winding 253 is connected to a connection between the switching device 275 and the switching device 276.

The other end of the U-phase winding 261 is connected to a connection between the switching device 281 and the switching device 282. The other end of the V-phase winding 262 is connected to a connection between the switching device 283 and the switching device 284. The other end of the W-phase winding 263 is connected to a connection between the switching device 285 and the switching device 286.

Each of the voltage sensors 250 is installed at a corresponding location between a corresponding one of the switching devices 272, 274, 276 and the ground and is configured to measure an electric potential difference at this location. Each of the voltage sensors 260 is installed at a corresponding location between a corresponding one of the switching devices 282, 284, 286 and the ground and is configured to measure an electric potential difference at this location.

The housing 12 is not movable relative to the stator 21 of the electric motor 20.

The ECU 10 is configured to control an operation of the electric motor 20 by controlling the electric power supplied to the coil 22. When the electric power is supplied to the coil 22, a rotating magnetic field is generated at the stator 21. Thereby, the rotor 23 is rotated. Thus, torque is outputted from the shaft 24. As described above, the electric motor 20 is configured to output the torque.

More specifically, the ECU 10 is configured to control the switching operations of the switching devices 271-276, 281-286 to control the electric power supplied from the battery to the winding sets 25, 26. Thus, the ECU 10 can control the operation of the electric motor 20 such that the rotor 23 is rotated forward or backward.

As described above, in the present embodiment, the electric motor 20 has the two winding sets 25, 26, i.e., two winding systems. At the normal time, the torque is outputted from the electric motor 20 through the energization to the two winding systems. At the time of emergency where one of the two winding sets is broken, the electric motor 20 can be operated continuously with the remaining one of the two winding sets. In such a case, the torque, which is outputted from the electric motor 20, is about one half of the torque outputted from the electric motor 20 at the normal time.

The ECU 10 can measure the value of the electric current conducted through the winding sets 25, 26 based on the voltage detected with the respective voltage sensors 250, 260. In this way, the ECU 10 can sense the breakage of the respective winding sets 25, 26.

The speed reducer 30 includes: an eccentric portion 31, which serves as an eccentric rotatable body; a planetary gear 32; a ring gear 33; and a ring gear 430, which serves as an output member. The eccentric portion 31 is shaped in a tubular form such that an outer peripheral wall of the eccentric portion 31 is eccentric to an inner peripheral wall of the eccentric portion 31. The eccentric portion 31 is located on a radially outer side of the inner tubular portion 121 and is formed integrally with the shaft 24 such that the inner peripheral wall of the eccentric portion 31 is coaxial with the shaft 24. Specifically, the eccentric portion 31 and the shaft 24 are not rotatable relative to each other. Therefore, the eccentric portion 31 is rotatable integrally with the shaft 24 in a state where the outer peripheral wall of the eccentric portion 31 is eccentric to the shaft 24. A bearing 152 is installed between the inner peripheral wall of the eccentric portion 31 and the outer peripheral wall of the inner tubular portion 121. Thus, the eccentric portion 31 is rotatably supported by the inner tubular portion 121 through the bearing 152.

The eccentric portion 31 has an axis Ax2 that is eccentric to an axis Ax1 of the electric motor 20. The axis Ax1 coincides with a central axis of the inner peripheral wall of the eccentric portion 31. The axis Ax2 coincides with a central axis of the outer peripheral wall of the eccentric portion 31. The eccentric portion 31 is rotatable about the axis Ax1 of the electric motor 20 relative to the inner tubular portion 121 of the housing 12. Furthermore, the axis Ax1 of the electric motor 20 coincides with a central axis of the shaft 24.

The planetary gear 32 is shaped generally in a circular ring form. The planetary gear 32 has a plurality of primary external teeth 321 and a plurality of secondary external teeth 322. The primary external teeth 321 are formed at an outer peripheral wall of the planetary gear 32 at one axial end of the planetary gear 32. The secondary external teeth 322 are formed at the planetary gear 32 on the other axial end side of the primary external teeth 321. A diameter of an addendum circle of the secondary external teeth 322 is smaller than a diameter of an addendum circle of the primary external teeth 321. The primary external teeth 321 and the secondary external teeth 322 are coaxial with an inner peripheral wall of the planetary gear 32.

The planetary gear 32 is located on a radially outer side of the eccentric portion 31. A bearing 153 and a bearing 154 are installed between the inner peripheral wall of the planetary gear 32 and the outer peripheral wall of the eccentric portion 31. Thus, the planetary gear 32 is rotatably supported by the eccentric portion 31 through the bearing 153 and the bearing 154. The planetary gear 32 is coaxially rotatable relative to the eccentric portion 31 and is rotatable relative to the shaft 24 in a state where the planetary gear 32 is eccentric to the shaft 24.

The ring gear 33 is shaped generally in a ring form. The ring gear 33 has a plurality of internal teeth 331. The internal teeth 331 are formed at an inner peripheral wall of the ring gear 33 at one axial end of the ring gear 33. The ring gear 33 is fixed to the housing 12 such that an outer peripheral wall of an end part of the ring gear 33, which is opposite to the internal teeth 331, is fitted to an inner peripheral wall of an end part of the outer tubular portion 123 of the housing 12. A diameter of an addendum circle of the internal teeth 331 is larger than the diameter of the addendum circle of the primary external teeth 321 of the planetary gear 32. Furthermore, the number of the internal teeth 331 is larger than the number of the primary external teeth 321.

The planetary gear 32 is installed such that the primary external teeth 321 are meshed with the internal teeth 331 of the ring gear 33. Therefore, when the rotor 23 and the shaft 24 are rotated, the planetary gear 32 is revolved and rotated at an inside of the ring gear 33 while the primary external teeth 321 of the planetary gear 32 are meshed with the internal teeth 331 of the ring gear 33.

Figure 3:
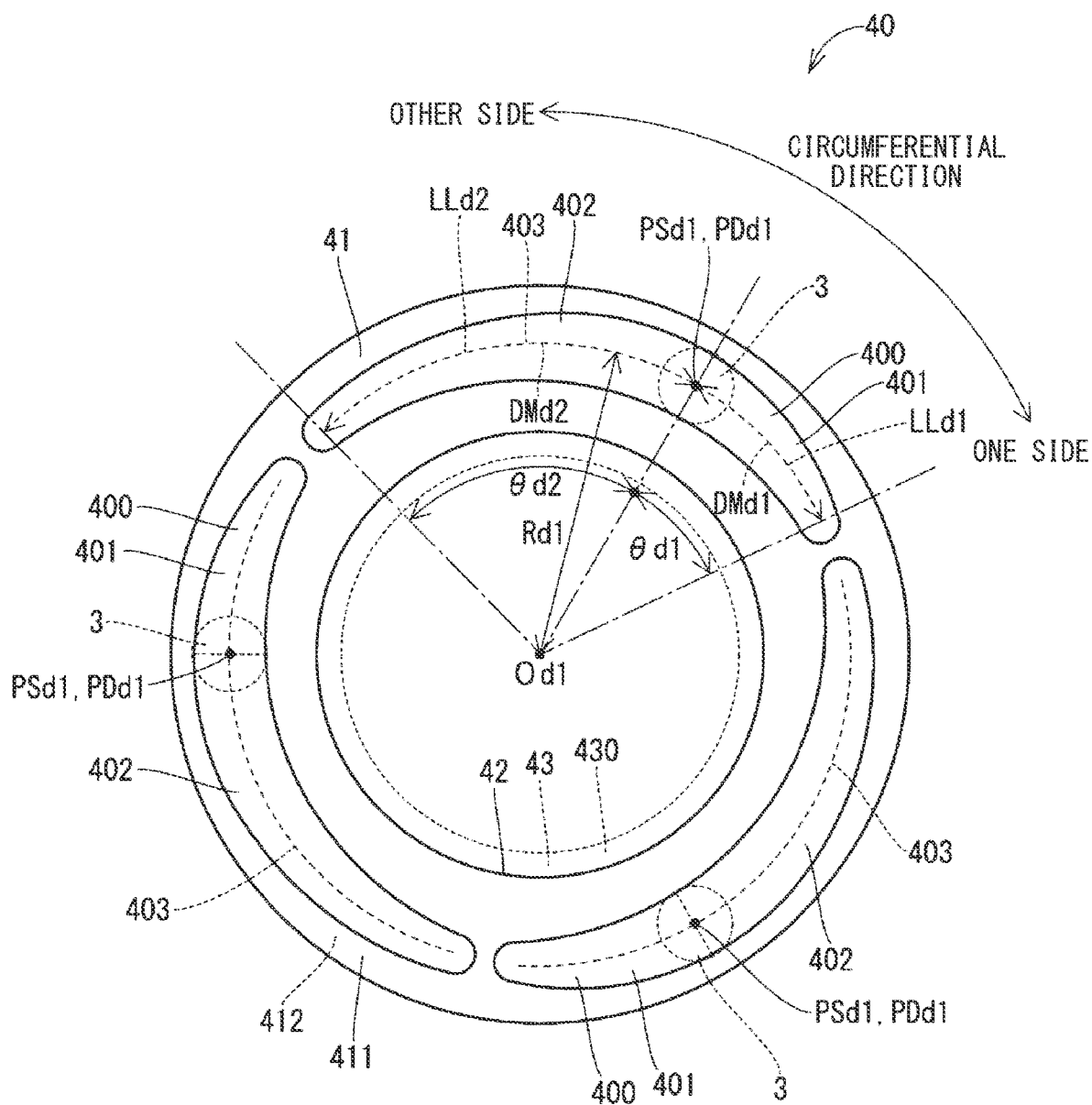
FIG. 3 is a diagram indicating a drive cam of the clutch device according to the first embodiment.

The drive cam 40 includes a drive cam main body 41, a drive cam hole 42 and a plurality of drive cam grooves 400 (see FIG. 3). The drive cam main body 41 is shaped generally in a circular plate form and is made of, for example, metal. The drive cam hole 42 is shaped in a circular form and is coaxial with the drive cam main body 41 such that the drive cam hole 42 extends through a center of the drive cam main body 41.

The drive cam grooves 400 are recessed from one end surface 411 of the drive cam main body 41 toward the other end surface 412 of the drive cam main body 41 in the axial direction. Each of the drive cam grooves 400 is formed such that a depth of the drive cam groove 400 changes in a circumferential direction of the drive cam 40. The number of the drive cam grooves 400 is three, and these three drive cam grooves 400 are arranged one after another at equal intervals in the circumferential direction of the drive cam main body 41. Details of the drive cam grooves 400 will be described later.

The ring gear 430, which serves as an output member of the speed reducer 30, is shaped in a ring form and is formed integrally with the drive cam 40 in one-piece at a radially inner side of the drive cam hole 42 of the drive cam 40. The ring gear 430 includes a plurality of drive cam internal teeth 43. The drive cam internal teeth 43 are formed at an inner peripheral part of the ring gear 430.

A diameter of an addendum circle of the drive cam internal teeth 43 is larger than the diameter of the addendum circle of the secondary external teeth 322 of the planetary gear 32. Furthermore, the number of the drive cam internal teeth 43 is larger than the number of the secondary external teeth 322. The drive cam 40 is placed at an inside of the outer tubular portion 125 (serving as the tubular portion) of the housing 12 on a side of the ring gear 33, which is opposite to the stator 21, such that the drive cam internal teeth 43 of the ring gear 430 are meshed with the secondary external teeth 322 of the planetary gear 32. Therefore, when the planetary gear 32 is rotated and revolved at the inside of the ring gear 33 in response to rotation of the rotor 23 and the shaft 24, the drive cam 40 is rotated at the inside of the outer tubular portion 125 of the housing 12 relative to the outer tubular portion 125. As described above, the drive cam 40 has the drive cam grooves 400 formed at the one end surface 411 of the drive cam 40, and the drive cam 40 is configured to be rotated by the torque outputted from the speed reducer 30.

The speed reducer 30 reduces a rotational speed of rotation generated by the torque received from the electric motor 20 and outputs the torque of the rotation of the reduced rotational speed to the drive cam 40 through the ring gear 430 (serving as the output member). As described above, the speed reducer 30 is configured to reduce the rotational speed of the rotation generated by the torque received from the electric motor 20 and output the torque of the rotation of the reduced rotational speed. Here, a speed reduction ratio of the speed reducer 30 is set by appropriately setting the number of the primary external teeth 321 of the planetary gear 32 and the number of the internal teeth 331 of the ring gear 33. Generally, the efficiency of the speed reducer is higher as the speed reduction ratio is smaller.

A thrust bearing 161 is placed on the radially outer side of the ring gear 33 at a location that is between an outer peripheral part of the drive cam 40 and the outer bottom portion 124 of the housing 12. The thrust bearing 161 rotatably supports the drive cam 40 while the thrust bearing 161 receiving a load from the drive cam 40 in a thrust direction. Specifically, the thrust bearing 161 is placed between the outer bottom portion 124 (serving as the bottom portion) and the drive cam 40 and receives the load of the drive cam 40 in the axial direction.

Each of the balls 3 is shaped in a spherical form and is made of, for example, metal. The balls 3 serve as rolling elements. Each of the balls 3 is rotatably installed in a corresponding one of the drive cam grooves 400 (see FIG. 3). Specifically, the number of the balls 3 is three.

Figure 4:
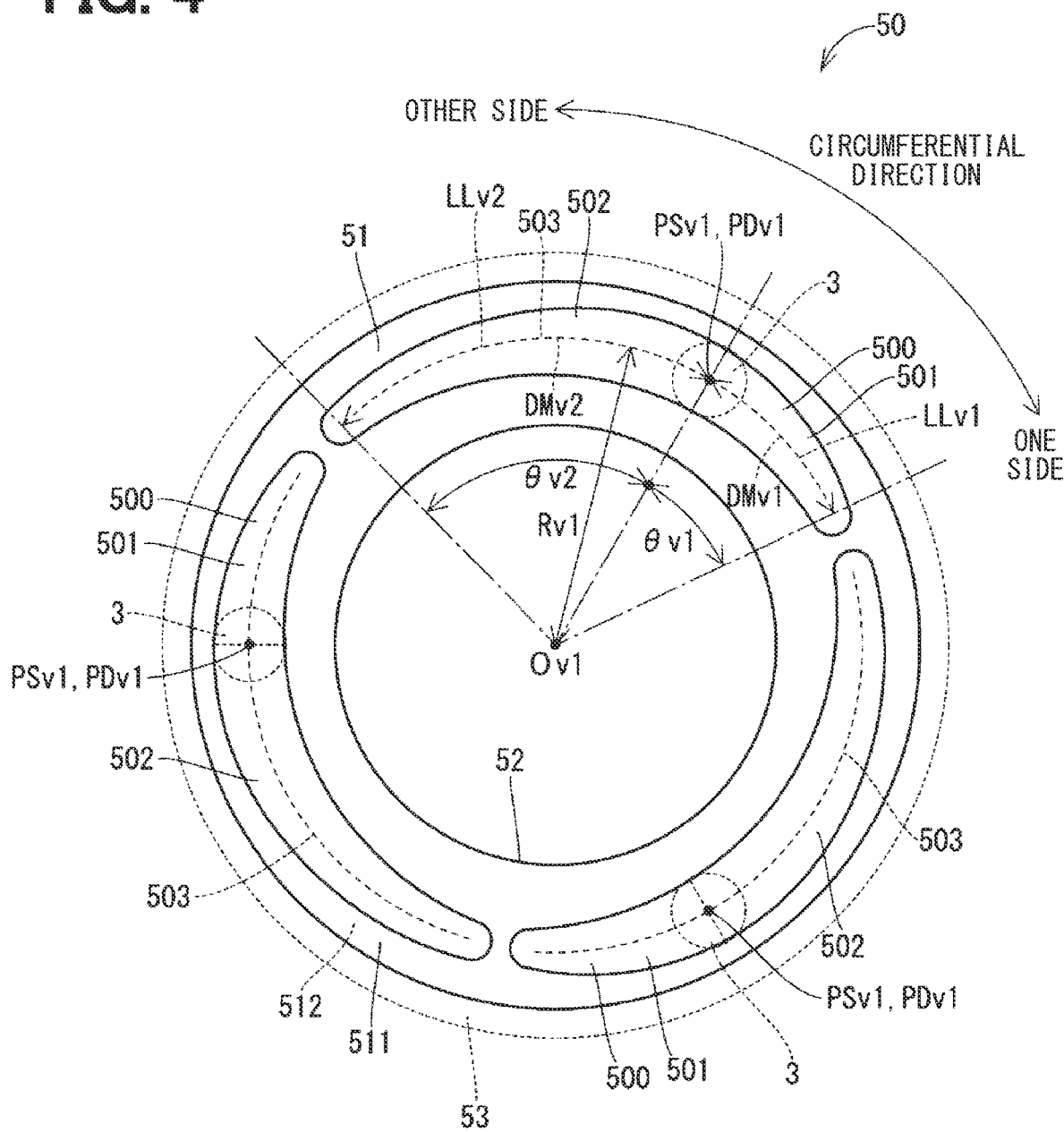
FIG. 4 is a diagram indicating a driven cam of the clutch device according to the first embodiment.

The driven cam 50 includes a driven cam main body 51, a driven cam hole 52, a plurality of spline coupling portions 53 and a plurality of driven cam grooves 500 (see FIG. 4). The driven cam main body 51 is shaped generally in a circular plate form and is made of, for example, metal. The driven cam hole 52 is shaped in a circular form and is coaxial with the driven cam main body 51 such that the driven cam hole 52 extends through a center of the driven cam main body 51. The spline coupling portions 53 are formed integrally with the driven cam main body 51 and are arranged at an outer peripheral part of the driven cam main body 51. The spline coupling portions 53 are arranged one after another in the circumferential direction of the driven cam main body 51 such that the spline coupling portions 53 extend from one end surface 511 of the driven cam main body 51 to the other end surface 512 of the driven cam main body 51 in the axial direction.

The driven cam grooves 500 are recessed from the one end surface 511 of the driven cam main body 51 toward the other end surface 512 of the driven cam main body 51 in the axial direction. Each of the driven cam grooves 500 is formed such that a depth of the driven cam groove 500 changes in a circumferential direction of the driven cam 50. The number of the driven cam grooves 500 is three, and these three driven cam grooves 500 are arranged one after another at equal intervals in the circumferential direction of the driven cam main body 51. Details of the driven cam grooves 500 will be described later.

The driven cam 50 is placed at the inside of the outer tubular portion 125 (serving as the tubular portion) of the housing 12 such that the spline coupling portions 53 of the driven cam 50 are spline-coupled to the spline grooves 126 of the housing 12. Therefore, the driven cam 50 is not rotatable relative to the outer tubular portion 125 of the housing 12 and is axially movable relative to the outer tubular portion 125 of the housing 12.

The driven cam 50 is located on a side of the drive cam 40, which is opposite to the ring gear 33, such that each of the balls 3 is clamped between the corresponding driven cam groove 500 of the driven cam 50 and the corresponding drive cam groove 400 of the drive cam 40, and thereby the driven cam 50 cooperates with the drive cam 40 and the balls 3 to form the ball cam 2. The ball cam 2 serves as a rolling element cam. The drive cam 40 is rotatable relative to the driven cam 50 and the housing 12. When the drive cam 40 is rotated relative to the driven cam 50, each ball 3 is rolled along a groove bottom 403 of the corresponding drive cam groove 400 and a groove bottom 503 of the corresponding driven cam groove 500.

As described above, each of the drive cam grooves 400 and each of the driven cam grooves 500 are formed such that the depth of the drive cam groove 400 and the depth of the driven cam groove 500 change in the circumferential direction of the drive cam 40 and the driven cam 50. Therefore, when the drive cam 40 is rotated relative to the driven cam 50 by the torque outputted from the speed reducer 30, each ball 3 is rolled along the corresponding drive cam groove 400 and the corresponding driven cam groove 500, and thereby the driven cam 50 is moved in the axial direction relative to the drive cam 40 and the housing 12 (see FIGS. 5 to 7).

As described above, the driven cam 50 has the driven cam grooves 500, which are formed at the one end surface 511 such that each ball 3 is clamped between the corresponding driven cam groove 500 and the corresponding drive cam groove 400, and the driven cam 50 cooperates with the drive cam 40 and the balls 3 to form the ball cam 2. Furthermore, when the relative rotation is made between the driven cam 50 and the drive cam 40, the driven cam 50 is moved in the axial direction relative to the drive cam 40.

The output shaft 62 includes a shaft portion 621, a plate portion 622, a tubular portion 623 and a friction plate 624. The shaft portion 621 is shaped generally in a cylindrical tubular form. The plate portion 622 is formed integrally with the shaft portion 621 in one-piece such that the plate portion 622 is shaped in a ring plate form and radially outwardly extends from one end of the shaft portion 621. The tubular portion 623 is formed integrally with the plate portion 622 in one-piece such that the tubular portion 623 is shaped generally in a cylindrical tubular form and extends from an outer peripheral part of the plate portion 622 toward a side that is opposite to the shaft portion 621. The friction plate 624 is shaped generally in a circular ring plate form and is installed to an end surface of the plate portion 622, which is located on a side where the tubular portion 623 is placed. Here, the friction plate 624 is not rotatable relative to the plate portion 622.

An end part of the input shaft 61 extends through the driven cam hole 52 and is located on a side of the driven cam 50, which is opposite to the drive cam 40. The output shaft 62 is coaxial with the input shaft 61 and is located on a side of the housing 12, which is opposite to the stationary flange 11, i.e., is located on a side of the driven cam 50, which is opposite to the drive cam 40. A bearing 142 is installed between an inner peripheral wall of the shaft portion 621 and an outer peripheral wall of the end part of the input shaft 61. Thereby, the output shaft 62 is rotatably supported by the input shaft 61 through the bearing 142.

The clutch 70 is located on the side of the driven cam 50, which is opposite to the drive cam 40. The clutch 70 includes a plurality of inner friction plates 71 and a plurality of outer friction plates 72. Each of the inner friction plates 71 is shaped generally in a circular ring plate form, and these inner friction plates 71 are located between the input shaft 61 and the tubular portion 623 of the output shaft 62 such that the inner friction plates 71 are arranged one after another in the axial direction. The inner friction plates 71 are installed such that inner peripheral parts of the inner friction plates 71 are spline-coupled to the outer peripheral wall of the input shaft 61. Therefore, the inner friction plates 71 are not rotatable relative to the input shaft 61 and are axially movable relative to the input shaft 61.

Each of the outer friction plates 72 is shaped generally in a circular ring plate form, and these outer friction plates 72 are located between the input shaft 61 and the tubular portion 623 of the output shaft 62 such that the outer friction plates 72 are arranged one after another in the axial direction. The inner friction plates 71 and the outer friction plates 72 are alternately arranged in the axial direction of the input shaft 61. The outer friction plates 72 are installed such that outer peripheral parts of the outer friction plates 72 are spline-coupled to the inner peripheral wall of the tubular portion 623 of the output shaft 62. Therefore, the outer friction plates 72 are not rotatable relative to the output shaft 62 and are axially movable relative to the output shaft 62. One of the outer friction plates 72, which is closest to the friction plate 624 among the outer friction plates 72, can contact the friction plate 624.

In a coupled state where the inner friction plates 71 and the outer friction plates 72 contact with each other, i.e., are coupled with each other, a frictional force is generated between each inner friction plate 71 and the adjacent outer friction plate 72, and relative rotation between the inner friction plate 71 and the adjacent outer friction plate 72 is limited according to the amount of this frictional force. In a decoupled state where the inner friction plates 71 and the outer friction plates 72 are spaced from each other, i.e., are decoupled from each other, the frictional force is not generated between each inner friction plate 71 and the adjacent outer friction plate 72, and the relative rotation between the inner friction plate 71 and the adjacent outer friction plate 72 is not limited.

In the coupled state of the clutch 70, the torque, which is inputted to the input shaft 61, is transmitted to the output shaft 62 through the clutch 70. In contrast, in the decoupled state of the clutch 70, the torque, which is inputted to the input shaft 61, is not transmitted to the output shaft 62.

As described above, the torque is transmitted between the output shaft 62 and the input shaft 61. In the coupled state of the clutch 70, the clutch 70 enables the transmission of the torque between the input shaft 61 and the output shaft 62. In the decoupled state of the clutch 70, the clutch 70 disables the transmission of the torque between the input shaft 61 and the output shaft 62.

In the present embodiment, the clutch device 1 is a normally open type clutch device that is normally placed in the decoupled state.

The piston 81 is shaped generally in a circular ring form and is placed between the driven cam 50 and the clutch 70 at a location that is on a radially outer side of the input shaft 61. A thrust bearing 162 is installed between the driven cam 50 and the piston 81. The thrust bearing 162 rotatably supports the piston 81 while the thrust bearing 162 receives a load in a thrust direction from the piston 81.

A return spring 82 and a retaining portion 83 are placed between the piston 81 and the clutch 70. The retaining portion 83 is shaped generally in a circular ring form, and an outer peripheral part of the retaining portion 83 is fitted to an inner peripheral wall of the tubular portion 623 of the output shaft 62. The retaining portion 83 can retain the outer peripheral part of the one of the outer friction plates 72, which is closest to the piston 81 among the outer friction plates 72. Therefore, removal of the outer friction plates 72 and the inner friction plates 71 from the inside of the tubular portion 623 is limited. A distance between the retaining portion 83 and the friction plate 624 is larger than a sum of the plate thicknesses of the outer friction plates 72 and the inner friction plates 71.

The return spring 82 is a coned-disc spring, and the return spring 82 is installed such that one end of the return spring 82 contacts the outer peripheral part of the piston 81, and the other end of the return spring 82 contacts the retaining portion 83. Thereby, the return spring 82 urges the piston 81 toward the driven cam 50.

As shown in FIGS. 1, 3 and 4, in a state where each of the balls 3 is placed at a deepest point PDd1, which is a farthest point of the drive cam groove 400 that is farthest from the one end surface 411, and a deepest point PDv1, which is a farthest point of the driven cam groove 500 that is farthest from the one end surface 511, a distance between the drive cam 40 and the driven cam 50 is relatively small, and a gap Sp1 is formed between the piston 81 and the outer friction plate 72 of the clutch 70 (see FIG. 1). Therefore, the clutch 70 is in the decoupled state, and the transmission of the torque between the input shaft 61 and the output shaft 62 is disabled.

When the electric power is supplied to the coil 22 of the electric motor 20 through the control operation of the ECU 10, the electric motor 20 is rotated. Thereby, the torque is outputted from the speed reducer 30, and the drive cam 40 is rotated relative to the housing 12. Thus, each of the balls 3 is rolled along the corresponding drive cam groove 400 and the corresponding driven cam groove 500. As a result, the driven cam 50 is axially moved relative to the drive cam 40, i.e., is moved toward the clutch 70. In this way, the piston 81 is urged by the driven cam 50 and is moved toward the clutch 70 against the urging force of the return spring 82.

When the piston 81 is urged by the driven cam 50 and is moved toward the clutch 70, the size of the gap Sp1 is reduced, and thereby the piston 81 contacts the outer friction plate 72 of the clutch 70. When the driven cam 50 further urges the piston 81 after the occurrence of the contact of the piston 81 to the clutch 70, the inner friction plates 71 and the outer friction plates 72 are coupled with each other. Thus, the clutch 70 is placed in the coupled state. Thereby, the transmission of the torque between the input shaft 61 and the output shaft 62 is enabled.

When the clutch transmission torque reaches a required clutch torque capacity, the ECU 10 stops the rotation of the electric motor 20. In this way, the clutch 70 is placed in a coupling holding state for holding the clutch transmission torque at the required clutch torque capacity. As described above, the piston 81 can receive the axial force from the driven cam 50 to shift the operational state of the clutch 70 to the coupled state or the decoupled state depending on the relative position of the driven cam 50 relative to the drive cam 40 in the axial direction.

The clutch 70 is placed on the side of the driven cam 50, which is opposite to the drive cam 40, and the clutch 70 shifts to the coupled state or the decoupled state depending on the relative position of the driven cam 50 relative to the drive cam 40 in the axial direction.

An end part of the shaft portion 621 of the output shaft 62, which is opposite to the plate portion 622, is connected to an input shaft of the transmission (not shown) and is thereby rotatable integrally with the input shaft of the transmission. Specifically, the torque, which is outputted from the output shaft 62, is inputted to the input shaft of the transmission. When the torque is inputted to the input shaft of the transmission to cause rotation of the input shaft, a rotational speed of this rotation is changed at the transmission, and then this rotation is outputted to drive wheels of the vehicle to provide drive torque to the drive wheels. Thereby, the vehicle is driven.

As shown in FIG. 1, in the present embodiment, at least a part of each drive cam groove 400 overlaps with the speed reducer 30 in the axial direction of the drive cam 40. Specifically, each drive cam groove 400 entirely overlaps with the ring gear 430 (serving as the output member), which is the portion of the speed reducer 30, in the axial direction of the drive cam 40. Thereby, the size of the clutch device 1, which is measured in the axial direction of the drive cam 40, can be reduced or minimized.

In the present embodiment, the speed reducer 30 further includes a limiting portion 34. The limiting portion 34 is formed integrally with the planetary gear 32 in one-piece such that the limiting portion 34 extends in a tubular form from an end surface of the planetary gear 32, which is axially located on the side where the clutch 70 is placed, toward the clutch 70 and thereafter extends in a ring form toward the radially inner side. A part of the limiting portion 34, which is in the tubular form, has an inner peripheral wall that is fitted to an outer peripheral wall of the bearing 154. Another part of the limiting portion 34, which is in the ring form, has a surface that is opposite to the clutch 70, and this surface can contact a surface of the bearing 154 located on the side where the clutch 70 is placed. Therefore, when the bearing 154 and the limiting portion 34 axially contact with each other, movement of the planetary gear 32 toward the electric motor 20 side is limited.

Here, each drive cam groove 400 entirely overlaps with the planetary gear 32 (the portion of the speed reducer 30), particularly with the secondary external teeth 322 of the planetary gear 32 in the axial direction of the drive cam 40.

Furthermore, an axial part of the limiting portion 34 of the speed reducer 30 is located on the radially inner side of the driven cam grooves 500 of the driven cam 50. Specifically, in the present embodiment, at least a portion of each driven cam groove 500 overlaps with the limiting portion 34 (the portion of the speed reducer 30) in the axial direction of the driven cam 50. Thereby, the size of the clutch device 1, which is measured in the axial direction of the drive cam 40 and the driven cam 50, can be reduced or minimized.

Next, the drive cam grooves 400 and the driven cam grooves 500 will be described in detail.

As shown in FIG. 3, each of the drive cam grooves 400 has a normal-time drive cam groove 401 and an emergency-time drive cam groove 402. The normal-time drive cam groove 401 extends from a corresponding drive cam specific point PSd1, which is defined as a specific point of the drive cam 40, toward one side in a circumferential direction of the drive cam 40. The groove bottom 403 at the normal-time drive cam groove 401 is sloped relative to the one end surface 411 of the drive cam 40 such that a depth of the groove bottom 403 continuously decreases from the drive cam specific point PSd1 toward the one side in the circumferential direction of the drive cam 40.

The emergency-time drive cam groove 402 extends from the drive cam specific point PSd1 toward the other side in the circumferential direction of the drive cam 40. The groove bottom 403 at the emergency-time drive cam groove 402 is sloped relative to the one end surface 411 of the drive cam 40 such that the depth of the groove bottom 403 continuously decreases from the drive cam specific point PSd1 toward the other side in the circumferential direction of the drive cam 40, and a slope angle of the groove bottom 403 of each of the drive cam grooves 400 relative to the one end surface 411 of the drive cam 40 is set such that the slope angle of the groove bottom 403 at the emergency-time drive cam groove 402 is smaller than the slope angle of the groove bottom 403 at the normal-time drive cam groove 401. In the circumferential direction of the drive cam 40, the drive cam specific point PSd1 coincides with the deepest point PDd1.

With reference to FIG. 4, each of the driven cam grooves 500 has a normal-time driven cam groove 501 and an emergency-time driven cam groove 502. The normal-time driven cam groove 501 extends from a corresponding driven cam specific point PSv1, which is defined as a specific point of the driven cam 50, toward one side in a circumferential direction of the driven cam 50. The groove bottom 503 at the normal-time driven cam groove 501 is sloped relative to the one end surface 511 of the driven cam 50 such that a depth of the groove bottom 503 continuously decreases from the driven cam specific point PSv1 toward the one side in the circumferential direction of the driven cam 50.

The emergency-time driven cam groove 502 extends from the driven cam specific point PSv1 toward the other side in the circumferential direction of the driven cam 50. The groove bottom 503 at the emergency-time driven cam groove 502 is sloped relative to the one end surface 511 of the driven cam 50 such that the depth of the groove bottom 503 continuously decreases from the driven cam specific point PSv1 toward the other side in the circumferential direction of the driven cam 50, and a slope angle of the groove bottom 503 of each of the driven cam grooves 500 relative to the one end surface 511 of the driven cam 50 is set such that the slope angle of the groove bottom 503 at the emergency-time driven cam groove 502 is smaller than the slope angle of the groove bottom 503 at the normal-time driven cam groove 501. In the circumferential direction of the driven cam 50, the driven cam specific point PSv1 coincides with the deepest point PDv1. Furthermore, the slope angle of the groove bottom 403 at the normal-time drive cam groove 401 is the same as the slope angle of the groove bottom 503 at the normal-time driven cam groove 501. Furthermore, the slope angle of the groove bottom 403 at the emergency-time drive cam groove 402 is the same as the slope angle of the groove bottom 503 at the emergency-time driven cam groove 502.

With reference to FIG. 3, in each of the drive cam grooves 400, a ratio between a tangent value of the slope angle of the groove bottom 403 relative to a circumferential movement distance DMd2 from the drive cam specific point PSd1 at the emergency-time drive cam groove 402 and a tangent value of the slope angle of the groove bottom 403 relative to a circumferential movement distance DMd1 from the drive cam specific point PSd1 at the normal-time drive cam groove 401 is 1:2.

As shown in FIG. 4, in each of the driven cam grooves 500, a ratio between a tangent value of the slope angle of the groove bottom 503 relative to a circumferential movement distance DMv2 from the driven cam specific point PSv1 at the emergency-time driven cam groove 502 and a tangent value of the slope angle of the groove bottom 503 relative to a circumferential movement distance DMv1 from the driven cam specific point PSv1 at the normal-time driven cam groove 501 is 1:2.

As shown in FIG. 3, in each of the drive cam grooves 400, a ratio between a circumferential angular extent θd2 of an entire locus LLd2 along the groove bottom 403 of the emergency-time drive cam groove 402 and a circumferential angular extent θd1 of an entire locus LLd1 along the groove bottom 403 of the normal-time drive cam groove 401 is 2:1. Here, the circumferential angular extent θd2 corresponds to an angle defined between a straight line, which connects between the center Od1 of the drive cam 40 and the drive cam specific point PSd1, and a straight line, which connects between the center Od1 and an end of the locus LLd2 along the groove bottom 403 of the emergency-time drive cam groove 402. Furthermore, the circumferential angular extent θd1 corresponds to an angle defined between the straight line, which connects between the center Od1 of the drive cam 40 and the drive cam specific point PSd1, and a straight line, which connects between the center Od1 and an end of the locus LLd1 along the groove bottom 403 of the normal-time drive cam groove 401.

As shown in FIG. 4, in each of the driven cam grooves 500, a ratio between a circumferential angular extent θv2 of an entire locus LLv2 along the groove bottom 503 of the emergency-time driven cam groove 502 and a circumferential angular extent θv1 of an entire locus LLv1 along the groove bottom 503 of the normal-time driven cam groove 501 is 2:1. Here, the circumferential angular extent θv2 corresponds to an angle defined between a straight line, which connects between the center Ov1 of the driven cam 50 and the driven cam specific point PSv1, and a straight line, which connects between the center Ov1 and an end of the locus LLv2 along the groove bottom 503 of the emergency-time driven cam groove 502. Furthermore, the circumferential angular extent θv1 corresponds to an angle defined between the straight line, which connects between the center Ov1 of the driven cam 50 and the driven cam specific point PSv1, and a straight line, which connects between the center Ov1 and an end of the locus LLv1 along the groove bottom 503 of the normal-time driven cam groove 501.

As shown in FIG. 3, in the drive cam 40, the number of the drive cam grooves 400, which respectively have the identical structure, is three, and these three drive cam grooves 400 are arranged at equal intervals in the circumferential direction of the drive cam 40. The normal-time drive cam groove 401 and the emergency-time drive cam groove 402 in each of the drive cam grooves 400 are formed such that the distance Rd1, which is measured between the center Od1 of the drive cam 40 and the groove bottom 403, is constant along the normal-time drive cam groove 401 and the emergency-time drive cam groove 402 in the circumferential direction of the drive cam 40.

As shown in FIG. 4, in the driven cam 50, the number of the driven cam grooves 500, which respectively have the identical structure, is three, and these three driven cam grooves 500 are arranged at equal intervals in the circumferential direction of the driven cam 50. The normal-time driven cam groove 501 and the emergency-time driven cam groove 502 in each of the driven cam grooves 500 are formed such that the distance Rv1, which is measured between the center Ov1 of the driven cam 50 and the groove bottom 503, is constant along the normal-time driven cam groove 501 and the emergency-time driven cam groove 502 in the circumferential direction of the driven cam 50.

The ECU 10 controls the switching operations of the switching devices 271-276, 281-286 to control the electric power supplied to the winding sets 25, 26. Thus, the ECU 10 can control the operation of the electric motor 20. Furthermore, the ECU 10 can determine whether it is the normal time, during which none of the two winding sets 25, 26 is broken, or the emergency time, during which one of the two winding sets 25, 26 is broken, based on the voltages sensed with the voltage sensors 250, 260.

At the normal time, during which none of the two winding sets 25, 26 is broken, the ECU 10 controls the operation of the electric motor 20 such that each of the balls 3 is rolled along the normal-time drive cam groove 401 of the corresponding drive cam groove 400 and the normal-time driven cam groove 501 of the corresponding driven cam groove 500. At this time, the ECU 10 energizes the two winding sets 25, 26 to output the torque from the electric motor 20, so that the drive cam 40 is rotated relative to the driven cam 50 such that the ball 3 is rotated along the normal-time drive cam groove 401 and the normal-time driven cam groove 501. Thus, the driven cam 50 is axially moved relative to the drive cam 40 and the housing 12 to change the operational state of the clutch 70 to the decoupled state or the coupled state.

In contrast, at the emergency time, during which one of the two winding sets 25, 26 is broken, the ECU 10 controls the operation of the electric motor 20 such that the electric motor 20 is rotated in an opposite direction, which is opposite to the rotational direct of the electric motor 20 at the normal time, so that each of the balls 3 is rolled along the emergency-time drive cam groove 402 of the corresponding drive cam groove 400 and the emergency-time driven cam groove 502 of the corresponding driven cam groove 500. At this time, the ECU 10 energizes the remaining unbroken winding set among the two winding sets 25, 26 to output the torque from the electric motor 20, so that the drive cam 40 is rotated relative to the driven cam 50 such that the ball 3 is rolled along the emergency-time drive cam groove 402 and the emergency-time driven cam groove 502. Thus, the driven cam 50 is axially moved relative to the drive cam 40 and the housing 12 to change the operational state of the clutch 70 to the decoupled state or the coupled state.

Figure 5:
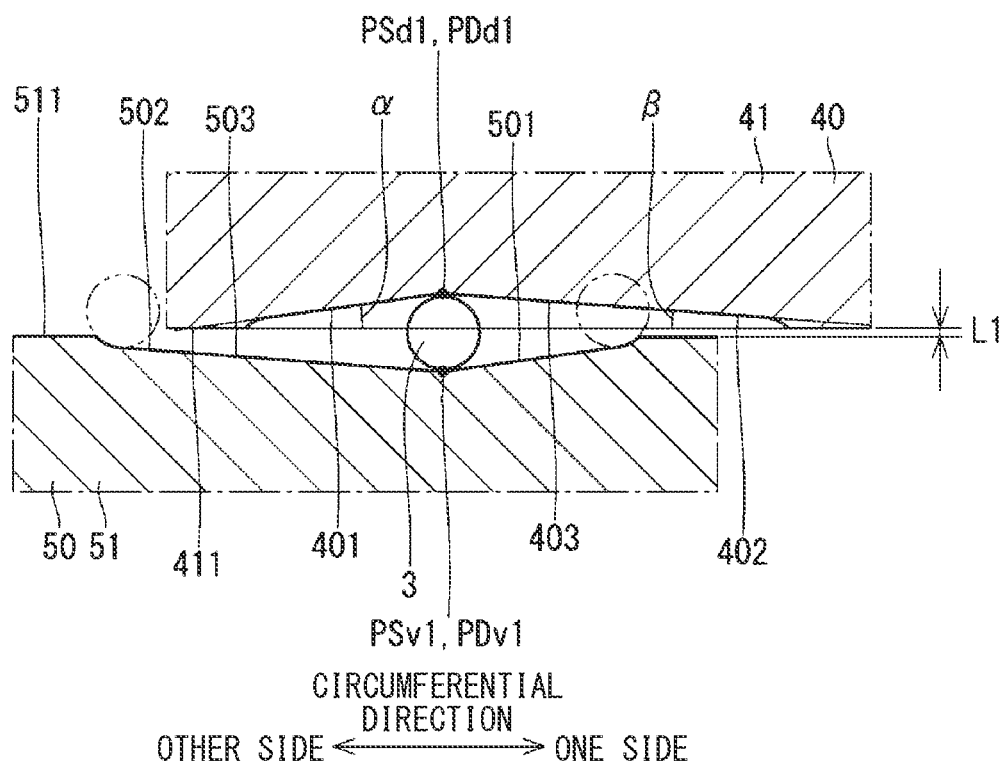
FIG. 5 is a cross-sectional view indicating a drive cam groove and a driven cam groove of the clutch device according to the first embodiment.
Figure 6:
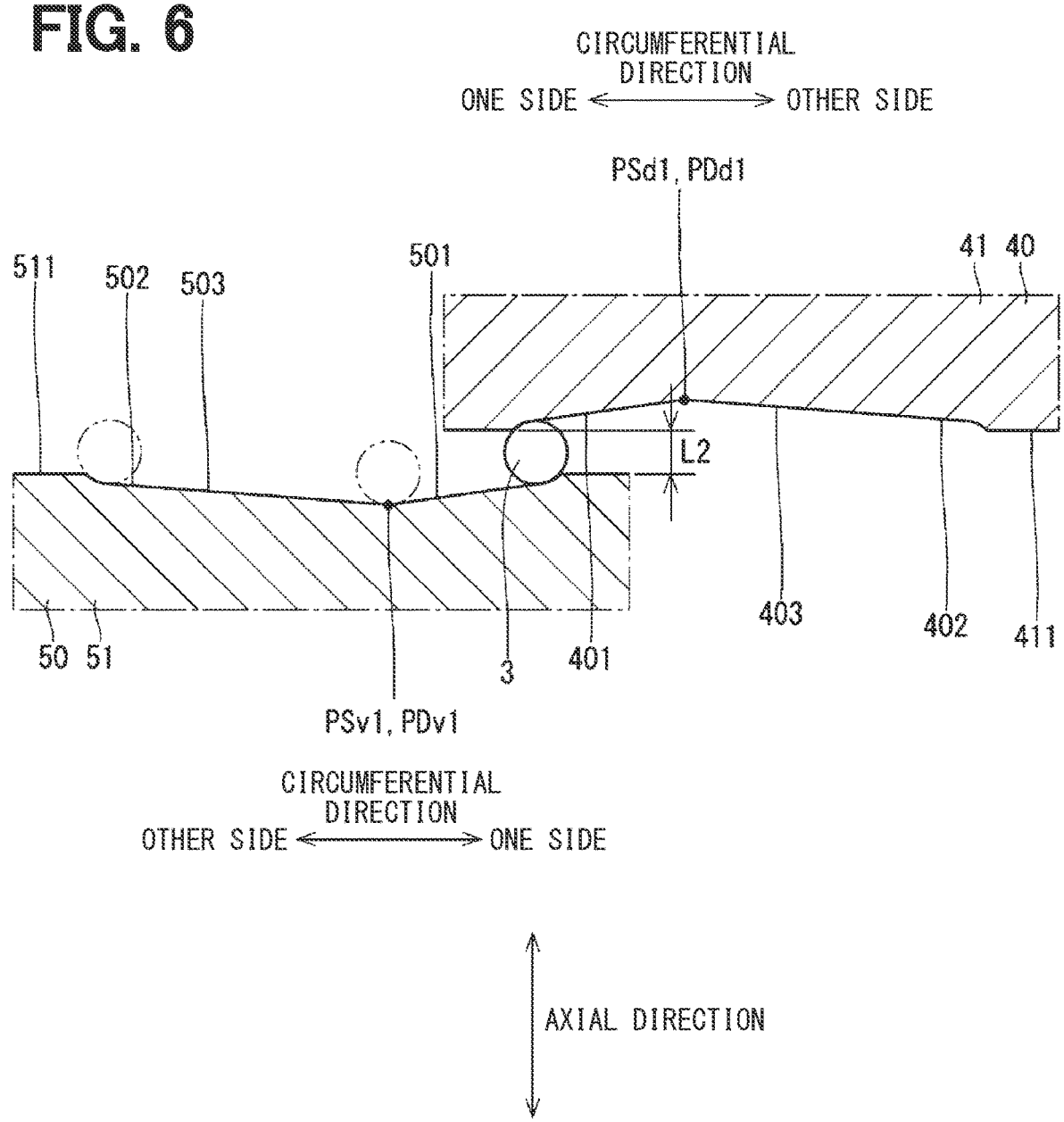
FIG. 6 is a cross-sectional view indicating the drive cam groove and the driven cam groove of the clutch device of the first embodiment, showing a state that is different from FIG. 5.
Figure 7:
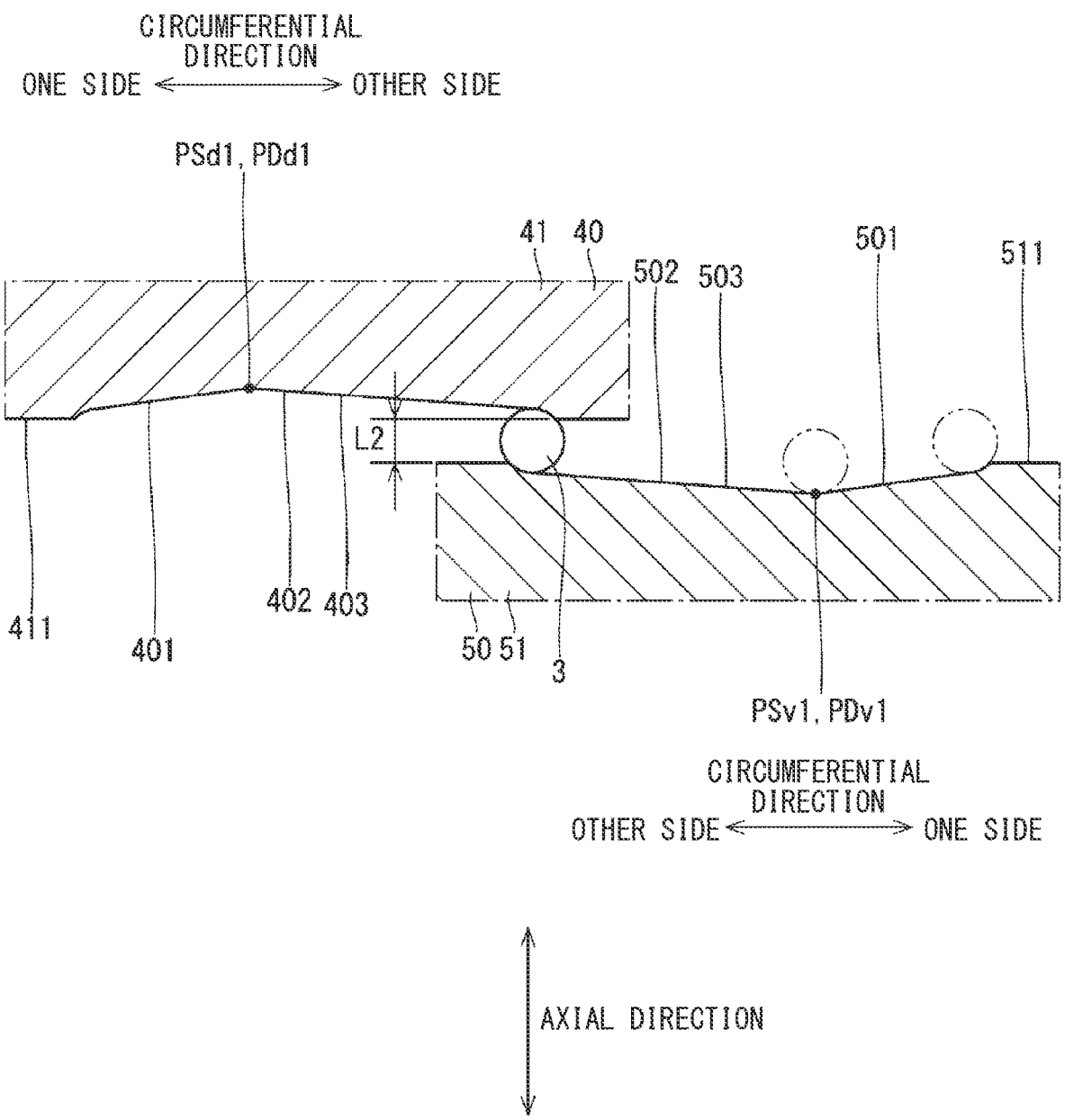
FIG. 7 is a cross-sectional view indicating the drive cam groove and the driven cam groove of the clutch device of the first embodiment, showing another state that is different from FIG. 5.

Next, the operation of the clutch device 1 will be described in further detail. FIGS. 5 to 7 indicate a curved cross section (i.e., a cross section taken along a curved plane) that extends along the groove bottom 403 of the drive cam groove 400 and the groove bottom 503 of the driven cam groove 500 and is parallel to the axis of the drive cam 40 and the driven cam 50.

As shown in FIG. 5, in the state where the energization of the electric motor 20 is stopped, the ball 3 is located at the drive cam specific point PSd1 and the driven cam specific point PSv1. At this time, the one end surface 411 of the drive cam 40 and the one end surface 511 of the driven cam 50 are spaced from each other by a distance L1.

Here, there is satisfied a relationship of tan α:tan β=2:1 where α denotes the slope angle of the groove bottom 403 at the normal-time drive cam groove 401, and β denotes the slope angle of the groove bottom 403 at the emergency-time drive cam groove 402.

At the normal time, during which none of the two winding sets 25, 26 is broken, the ball 3 is rolled along the normal-time drive cam groove 401 and the normal-time driven cam groove 501 and reaches an end of the normal-time drive cam groove 401, which is opposite to the drive cam specific point PSd1, and an end of the normal-time driven cam groove 501, which is opposite to the driven cam specific point PSv1 (see FIG. 6). At this time, the one end surface 411 of the drive cam 40 and the one end surface 511 of the driven cam 50 are spaced from each other by a distance L2.

In contrast, at the emergency time, during which one of the two winding sets 25, 26 is broken, the ball 3 is rolled along the emergency-time drive cam groove 402 and the emergency-time driven cam groove 502 and reaches an end of the emergency-time drive cam groove 402, which is opposite to the drive cam specific point PSd1, and an end of the emergency-time driven cam groove 502, which is opposite to the driven cam specific point PSv1 (see FIG. 7). At this time, the one end surface 411 of the drive cam 40 and the one end surface 511 of the driven cam 50 are spaced from each other by the distance L2.

Figure 8:
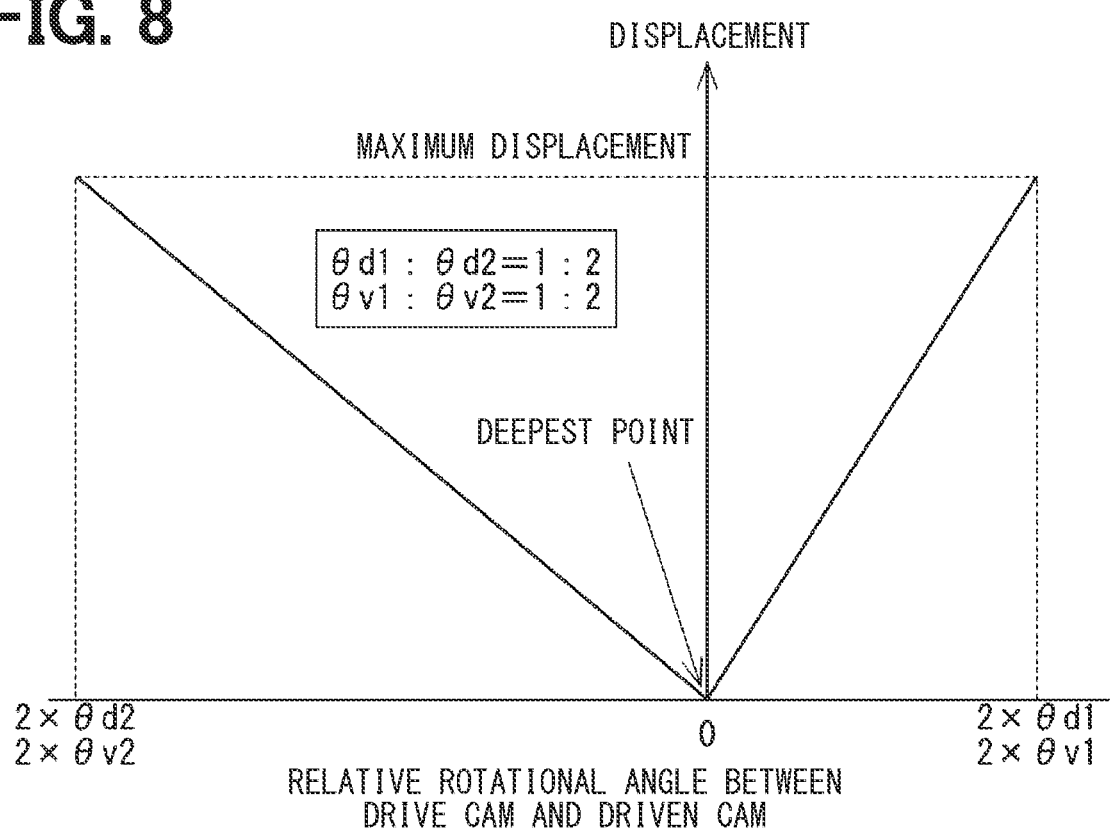
FIG. 8 is a diagram indicating a relationship between: a relative rotational angle between the drive cam and the driven cam of the clutch device; and the amount of displacement of the driven cam relative to the drive cam according to the first embodiment.

As described above, the maximum axial displacement of the driven cam 50 relative to the drive cam 40 is L2−L1 and corresponds to a sum of a groove depth difference between the deepest point PDd1 of the drive cam groove 400 and a shallowest point of the drive cam groove 400 and a groove depth difference between the deepest point PDv1 of the driven cam groove 500 and a shallowest point of the driven cam groove 500. FIG. 8 indicates a relationship between: the relative rotational angle between the drive cam 40 and the driven cam 50; and the displacement of the driven cam 50 relative to the drive cam 40.

As described above, in the present embodiment, the slope angle of the emergency-time drive cam groove 402 is set to be ½ of the slope angle of the normal-time drive cam groove 401, and the slope angle of the emergency-time driven cam groove 502 is set to be ½ of the slope angle of the normal-time driven cam groove 501. Thereby, when the ball 3 is rolled along the emergency-time drive cam groove 402 and the emergency-time driven cam groove 502, the output torque of the electric motor 20 can be further amplified in comparison to the normal state and converted into a translational thrust. Thus, at the emergency time, during which one of the two winding sets 25, 26 is broken, the electric motor 20 is rotated in the opposite direction, which is opposite to the rotational direction of the electric motor 20 at the normal time, and thereby the clutch 70 can be controlled in the same manner as in the normal time by using the emergency-time drive cam groove 402 and the emergency-time driven cam groove 502.

With the above configurations, in the present embodiment, the maximum translational force, which is substantially the same as the translational force generated by the electric motor 20 in the normal time, can be generated even with the reduced output torque that is outputted from the electric motor 20, in which the winding set of the one system is broken. Thus, it is possible to ensure the maximum transmission torque capacity of the normally open type clutch 70.

In the present embodiment, the slope angle of the emergency-time drive cam groove 402 is gently set to be ½ of the slope angle of the normal-time drive cam groove 401, and the slope angle of the emergency-time driven cam groove 502 is gently set to be ½ of the slope angle of the normal-time driven cam groove 501. Thereby, the circumferential length of the emergency-time drive cam groove 402 and the circumferential length of the emergency-time driven cam groove 502 are respectively increased in comparison to the circumferential length of the normal-time drive cam groove 401 and the circumferential length of the normal-time driven cam groove 501, so that a required rotational angle is increased at the emergency-time drive cam groove 402 and the emergency-time driven cam groove 502. Furthermore, although the drive response time of the electric motor 20 at the time of moving the ball 3 from the deepest point PDd1, PDV1 to the shallowest point is lengthened due to the decrease in the output torque of the electric motor 20 in the case where the winding set of the one system is broken, this should be allowed due to the emergency time caused by the breakage of the winding set of the one system.

In a clutch device, in which the previously proposed rolling element cam discussed at the begging of the detailed description of the present application is applied, in the case where the winding set of the drive device is broken, the torque of the drive device is lost, and thereby the drive cam may be rotated backward by a force applied from a load side (a drive subject side) to possibly cause collision of the rolling element against an end wall surface (serving as a stopper) at the end of the cam groove of the drive cam or of the driven cam. In such a case, a constituent element(s) of the rolling element cam may possibly be damaged. In the previously proposed rolling element cam, in order to limit the damage of the constituent element(s) by the collision of the rolling element against the wall surface of the cam groove, a resilient member, which can absorb a circumferential collision impact between the drive cam and the driven cam, is provided. However, in the case where the resilient member is provided, the number of the components and the number of assembling steps may possibly be disadvantageously increased.

In contrast to the above case, in the present embodiment, the emergency-time drive cam groove 402 is connected to the deepest point PDd1 of the normal-time drive cam groove 401, and the emergency-time driven cam groove 502 is connected to the deepest point PDv1 of the normal-time driven cam groove 501. Therefore, at the normal time, when the ball 3 returns to the deepest point PDd1, PDv1, the ball 3 will not collide against the wall surface of the drive cam groove 400 or the wall surface of the driven cam groove 500. Thus, the damage of the constituent element(s) of the ball cam 2 can be avoided.

As described above, in the present embodiment, each of the drive cam grooves 400 has the normal-time drive cam groove 401 and the emergency-time drive cam groove 402. The normal-time drive cam groove 401 extends from the corresponding drive cam specific point PSd1, which is defined as the specific point of the drive cam 40, toward the one side in the circumferential direction of the drive cam 40. The groove bottom 403 at the normal-time drive cam groove 401 is sloped relative to the one end surface 411 of the drive cam 40 such that the depth of the groove bottom 403 continuously decreases from the drive cam specific point PSd1 toward the one side in the circumferential direction of the drive cam 40.

The emergency-time drive cam groove 402 extends from the corresponding drive cam specific point PSd1 toward the other side in the circumferential direction of the drive cam 40. The groove bottom 403 at the emergency-time drive cam groove 402 is sloped relative to the one end surface 411 of the drive cam 40 such that the depth of the groove bottom 403 continuously decreases from the drive cam specific point PSd1 toward the other side in the circumferential direction of the drive cam 40, and the slope angle of the groove bottom 403 of each of the drive cam grooves 400 relative to the one end surface 411 of the drive cam 40 is set such that the slope angle of the groove bottom 403 at the emergency-time drive cam groove 402 is smaller than the slope angle of the groove bottom 403 at the normal-time drive cam groove 401.

Each of the driven cam grooves 500 has the normal-time driven cam groove 501 and the emergency-time driven cam groove 502. The normal-time driven cam groove 501 extends from the corresponding driven cam specific point PSv1, which is defined as the specific point of the driven cam 50, toward the one side in the circumferential direction of the driven cam 50. The groove bottom 503 at the normal-time driven cam groove 501 is sloped relative to the one end surface 511 of the driven cam 50 such that the depth of the groove bottom 503 continuously decreases from the driven cam specific point PSv1 toward the one side in the circumferential direction of the driven cam 50.

The emergency-time driven cam groove 502 extends from the driven cam specific point PSv1 toward the other side in the circumferential direction of the driven cam 50. The groove bottom 503 at the emergency-time driven cam groove 502 is sloped relative to the one end surface 511 of the driven cam 50 such that the depth of the groove bottom 503 continuously decreases from the driven cam specific point PSv1 toward the other side in the circumferential direction of the driven cam 50, and the slope angle of the groove bottom 503 of each of the driven cam grooves 500 relative to the one end surface 511 of the driven cam 50 is set such that the slope angle of the groove bottom 503 at the emergency-time driven cam groove 502 is smaller than the slope angle of the groove bottom 503 at the normal-time driven cam groove 501.

In the present embodiment, in the case where the one winding set among the two winding sets 25, 26 is broken, the other remaining winding set can be energized to output the torque from the electric motor 20 to rotate the drive cam 40. As a result, even when the one winding set among the two winding sets 25, 26 of the electric motor 20 is broken, the operation of the clutch device 1 can be continued.

Here, in the case where the one winding set among the two winding sets 25, 26 of the electric motor 20 is broken, the torque outputted from the electric motor 20 is reduced in comparison to the torque outputted from the electric motor 20 before the time of occurrence of the breakage of the one winding set among the two winding sets 25, 26. In view of this point, in the present embodiment, the slope angle of the groove bottom 403 at the emergency-time drive cam groove 402 and the slope angle of the groove bottom 503 at the emergency-time driven cam groove 502 are set to be smaller than the slope angle of the groove bottom 403 at the normal-time drive cam groove 401 and the slope angle of the groove bottom 503 at the normal-time driven cam groove 501, respectively. Thereby, when the ball 3 is rolled along the emergency-time drive cam groove 402 and the emergency-time driven cam groove 502, the drive cam 40 can be rotated with a small torque. Thus, at the normal time, during which none of the two winding sets is broken, the operation of the electric motor 20 is controlled such that the ball 3 is rolled along the normal-time drive cam groove 401 and the normal-time driven cam groove 501. Furthermore, at the emergency time, during which the one winding set among the two winding sets is broken, the operation of the electric motor 20 is controlled such that the ball 3 is rolled along the emergency-time drive cam groove 402 and the emergency-time driven cam groove 502, so that the operation of the clutch device 1 can be reliably continued.

Furthermore, in the present embodiment, there is provided the ECU 10 that is configured to control the energization of the winding sets 25, 26 to control the operation of the electric motor 20. At the normal time, during which none of the two winding sets 25, 26 is broken, the ECU 10 controls the operation of the electric motor 20 such that each of the balls 3 is rolled along the normal-time drive cam groove 401 of the corresponding drive cam groove 400 and the normal-time driven cam groove 501 of the corresponding driven cam groove 500. At the emergency time, during which one of the two winding sets 25, 26 is broken, the ECU 10 controls the operation of the electric motor 20 such that each of the balls 3 is rolled along the emergency-time drive cam groove 402 of the corresponding drive cam groove 400 and the emergency-time driven cam groove 502 of the corresponding driven cam groove 500.

In the present embodiment, even at the emergency time, during which the one of the two winding sets 25, 26 is broken, the operation of the clutch device 1 can be continued by controlling the operation of the electric motor 20 through the ECU 10.

Furthermore in the present embodiment, in each of the drive cam grooves 400, the ratio between the tangent value of the slope angle of the groove bottom 403 relative to the circumferential movement distance DMd2 from the drive cam specific point PSd1 at the emergency-time drive cam groove 402 and the tangent value of the slope angle of the groove bottom 403 relative to the circumferential movement distance DMd1 from the drive cam specific point PSd1 at the normal-time drive cam groove 401 is 1:2. In each of the driven cam grooves 500, a ratio between the tangent value of the slope angle of the groove bottom 503 relative to the circumferential movement distance DMv2 from the driven cam specific point PSv1 at the emergency-time driven cam groove 502 and the tangent value of the slope angle of the groove bottom 503 relative to the circumferential movement distance DMv1 from the driven cam specific point PSv1 at the normal-time driven cam groove 501 is 1:2.

Therefore, at the emergency time, during which the one of the two winding sets 25, 26 is broken, even when the torque outputted from the electric motor 20 is reduced to one half of the torque outputted from the electric motor 20 at the normal time, the operation of the clutch device 1 can be continued while ensuring generation of the translational thrust, which is substantially the same as the translational thrust generated at the normal time, by controlling the electric motor 20 such that each of the balls 3 is rolled along the emergency-time drive cam groove 402 of the corresponding drive cam groove 400 and the emergency-time driven cam groove 502 of the corresponding driven cam groove 500.

Furthermore, in the present embodiment, in each of the drive cam grooves 400, the ratio between the circumferential angular extent θd2 of the entire locus LLd2 of the emergency-time drive cam groove 402 and the circumferential angular extent θd1 of the entire locus LLd1 of the normal-time drive cam groove 401 is 2:1. In each of the driven cam grooves 500, the ratio between the circumferential angular extent θv2 of the entire locus LLv2 of the emergency-time driven cam groove 502 and the circumferential angular extent θv1 of the entire locus LLv1 of the normal-time driven cam groove 501 is 2:1.

Therefore, at the emergency time, during which the one of the two winding sets 25, 26 is broken, even when the torque outputted from the electric motor 20 is reduced to one half of the torque outputted from the electric motor 20 at the normal time, the operation of the clutch device 1 can be continued while ensuring generation of the translational thrust, which is substantially the same as the translational thrust generated at the normal time, by controlling the electric motor 20 such that each of the balls 3 is rolled along the emergency-time drive cam groove 402 of the corresponding drive cam groove 400 and the emergency-time driven cam groove 502 of the corresponding driven cam groove 500.

Second Embodiment

Figure 9:
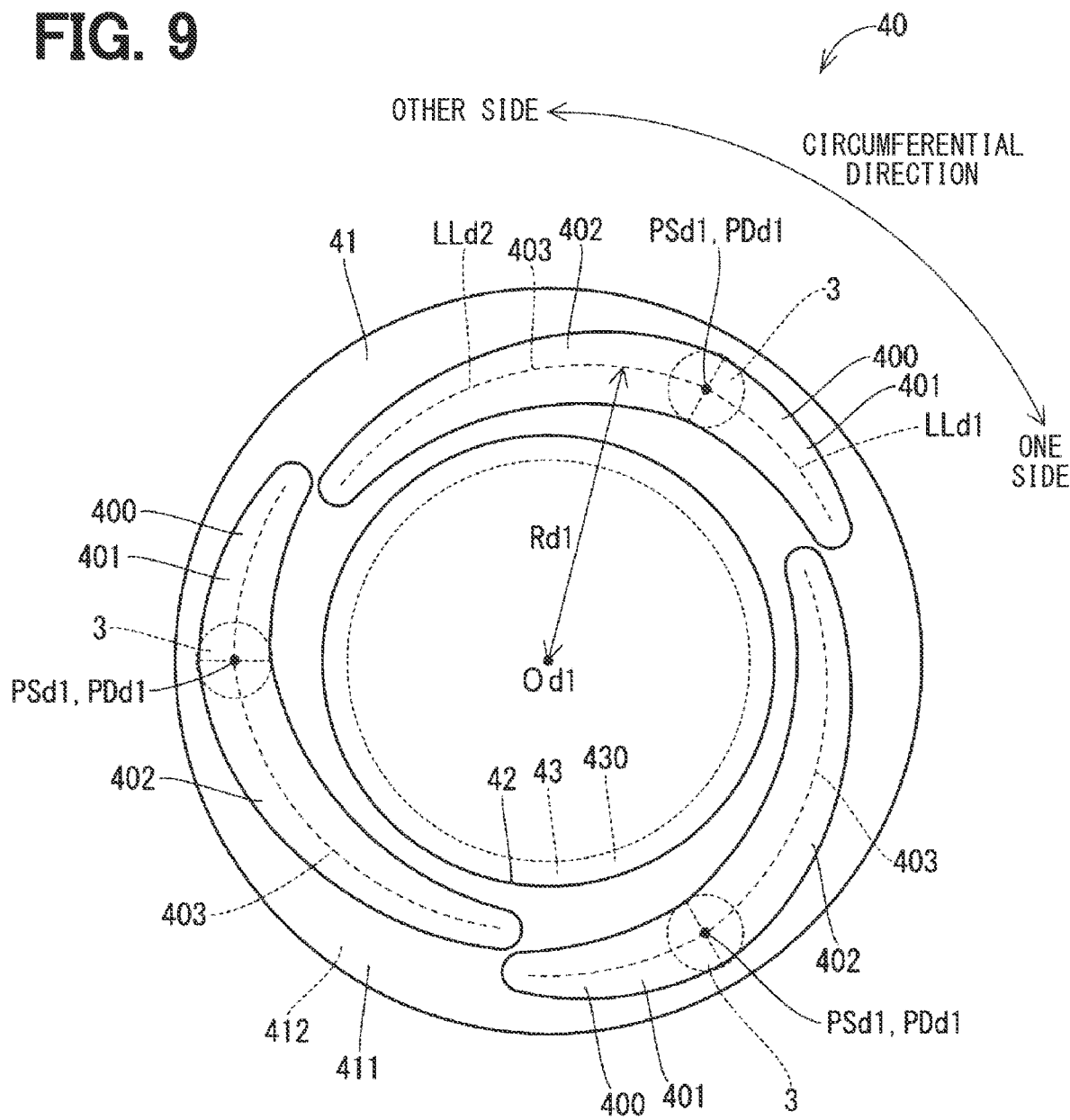
FIG. 9 is a diagram indicating a drive cam of a clutch device according to a second embodiment.
Figure 10:
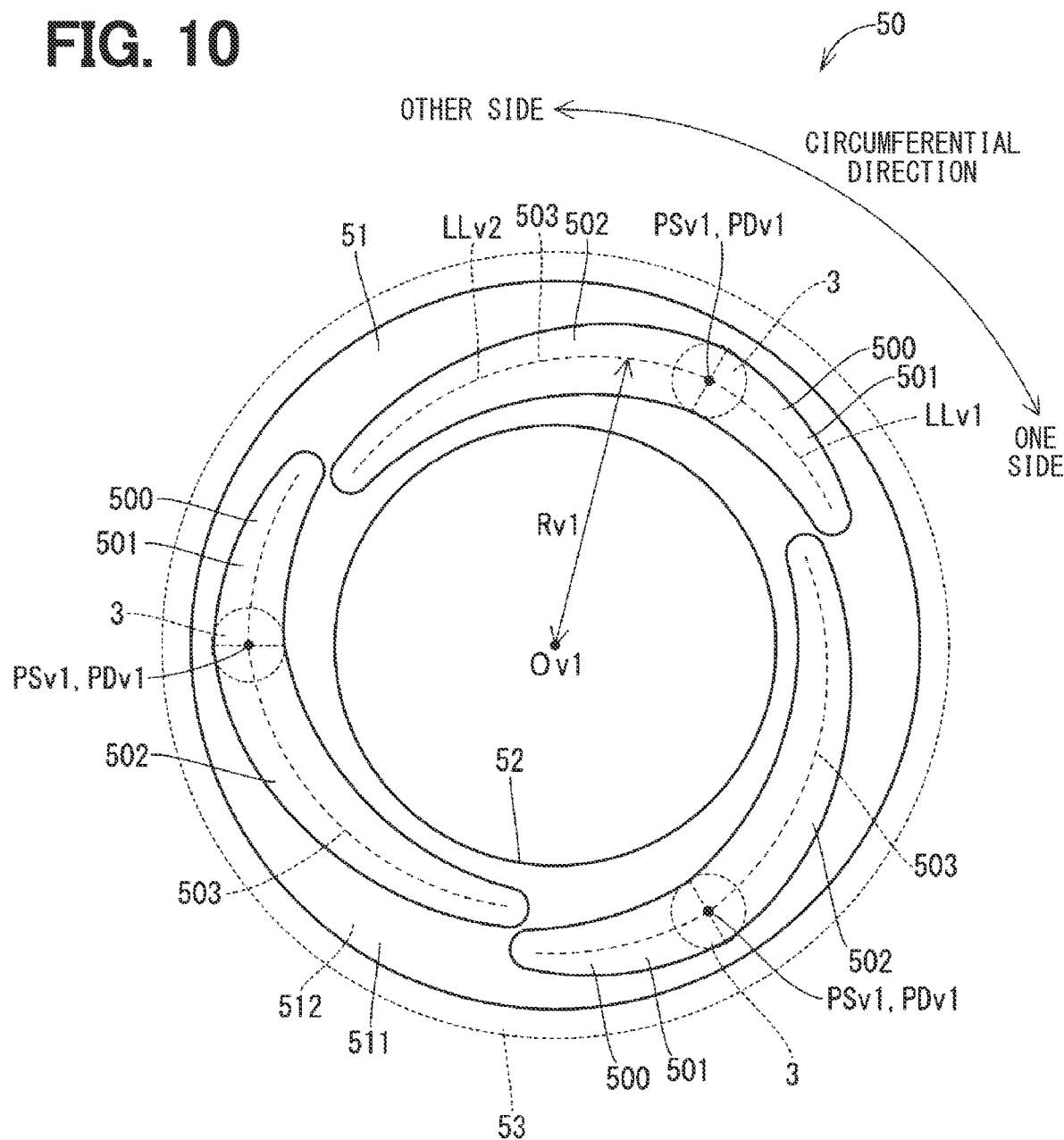
FIG. 10 is a diagram indicating a driven cam of the clutch device according to the second embodiment.

FIGS. 9 and 10 indicate a clutch device according to a second embodiment. The second embodiment differs from the first embodiment with respect to the configurations of the drive cam 40 and the driven cam 50.

As shown in FIG. 9, in the present embodiment, the emergency-time drive cam groove 402 in each of the drive cam grooves 400 is formed such that the distance Rd1 between the center Od1 of the drive cam 40 and the groove bottom 403 at the emergency-time drive cam groove 402 continuously changes from the one side toward the other side in the circumferential direction of the drive cam 40. Specifically, the emergency-time drive cam groove 402 in each of the drive cam grooves 400 is formed such that the distance Rd1 between the center Od1 of the drive cam 40 and the groove bottom 403 at the emergency-time drive cam groove 402 continuously decreases from the one side toward the other side in the circumferential direction of the drive cam 40.

As shown in FIG. 10, the emergency-time driven cam groove 502 in each of the driven cam grooves 500 is formed such that the distance Rv1 between the center Ov1 of the driven cam 50 and the groove bottom 503 at the emergency-time driven cam groove 502 continuously changes from the one side toward the other side in the circumferential direction of the driven cam 50. Specifically, the emergency-time driven cam groove 502 in each of the driven cam grooves 500 is formed such that the distance Rv1 between the center Ov1 of the driven cam 50 and the groove bottom 503 at the emergency-time driven cam groove 502 continuously decreases from the one side toward the other side in the circumferential direction of the driven cam 50.

With the above configurations, the circumferential length of the normal-time drive cam groove 401 measured in the circumferential direction of the drive cam 40 and the circumferential length of the normal-time driven cam groove 501 measured in the circumferential direction of the driven cam 50 can be increased in comparison to the first embodiment. With the above configurations, an operational angular range of the normal-time drive cam groove 401 and an operational angular range of the normal-time driven cam groove 501, which are used at the normal time, can be increased, and thereby it is possible to relax design restrictions.

Third Embodiment

Figure 11:
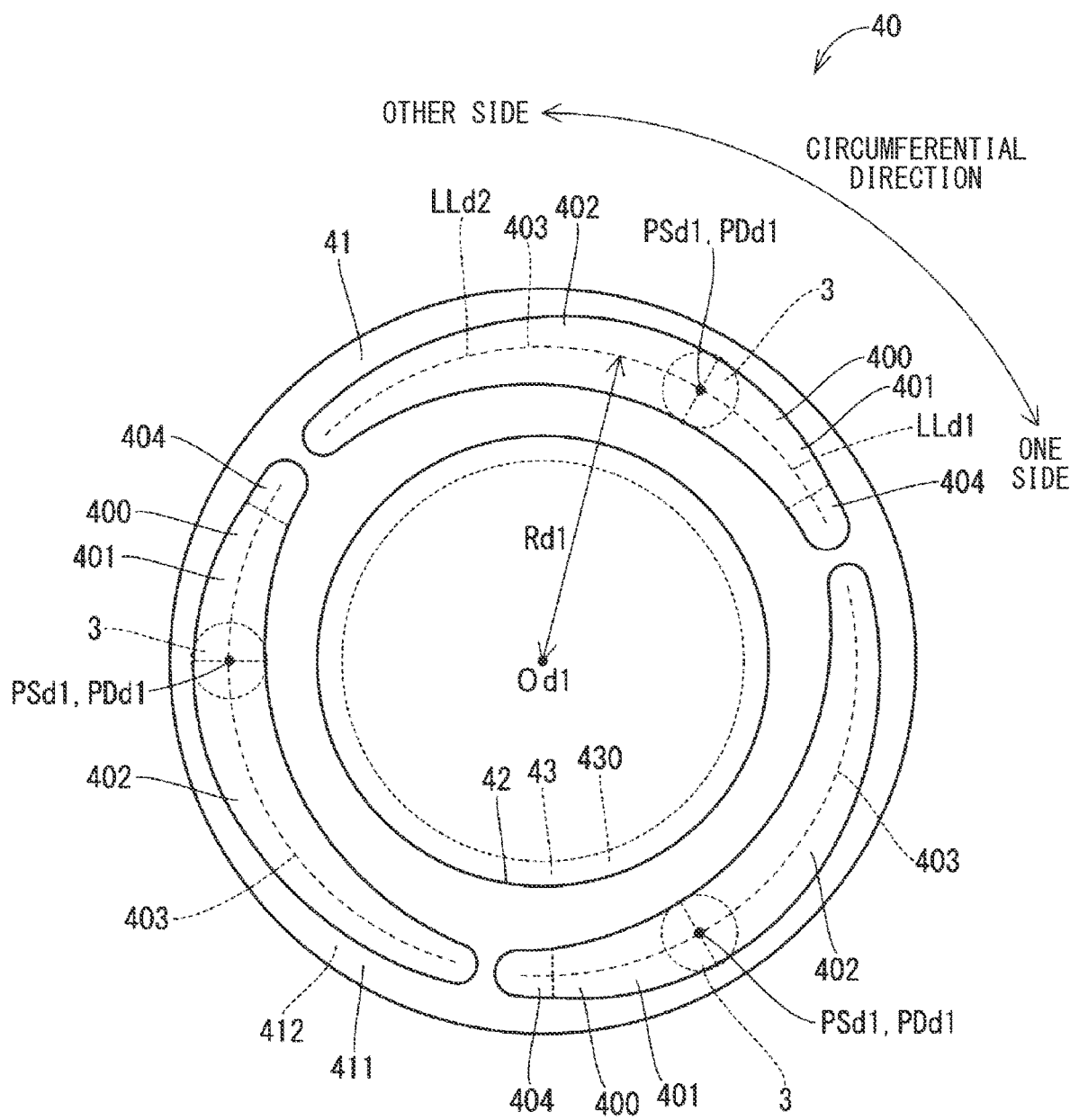
FIG. 11 is a diagram indicating a drive cam of a clutch device according to a third embodiment.
Figure 12:
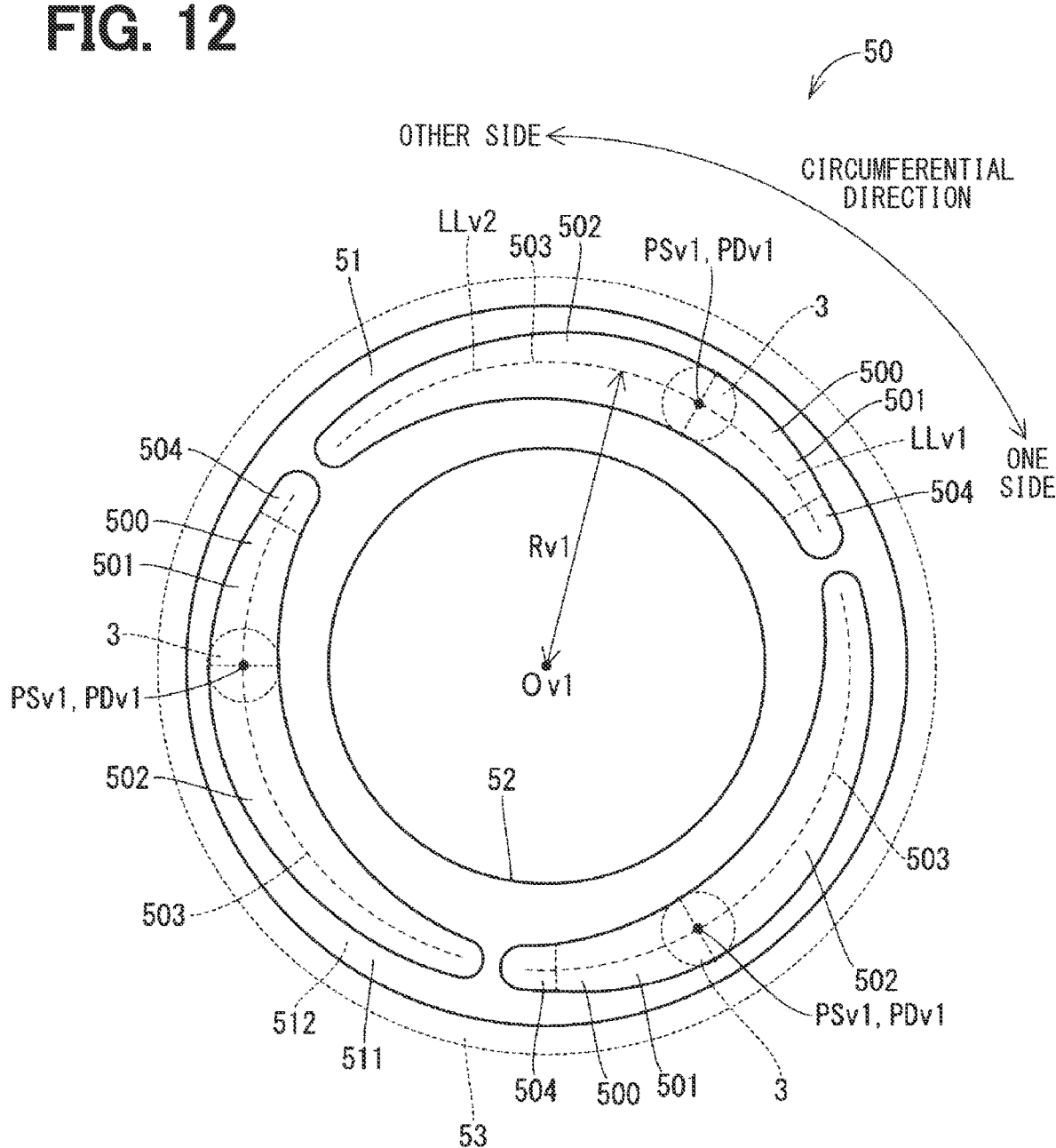
FIG. 12 is a diagram indicating a driven cam of the clutch device according to the third embodiment.

FIGS. 11 and 12 indicate a clutch device according to a third embodiment. The third embodiment differs from the first embodiment with respect to the configurations of the drive cam 40 and the driven cam 50.

In the present embodiment, each of the drive cam grooves 400 has a drive cam planar groove 404. The drive cam planar groove 404 extends in the circumferential direction of the drive cam 40 from an end of the normal-time drive cam groove 401, which is opposite to the drive cam specific point PSd1. At the drive cam planar groove 404, the groove bottom 403 is parallel to the one end surface 411 of the drive cam 40 such that the depth of the groove bottom 403 is constant in the circumferential direction of the drive cam 40. Specifically, a slope angle of the groove bottom 403 at the drive cam planar groove 404 relative to the one end surface 411 of the drive cam 40 is zero degrees.

Each of the driven cam grooves 500 has a driven cam planar groove 504. The driven cam planar groove 504 extends in the circumferential direction of the driven cam 50 from an end of the normal-time driven cam groove 501, which is opposite to the driven cam specific point PSv1. At the driven cam planar groove 504, the groove bottom 503 is parallel to the one end surface 511 of the driven cam 50 such that the depth of the groove bottom 503 is constant in the circumferential direction of the driven cam 50. Specifically, a slope angle of the groove bottom 503 at the driven cam planar groove 504 relative to the one end surface 511 of the driven cam 50 is zero degrees.

With the above configurations, in the state where the ball 3 is placed at the drive cam planar groove 404 and the driven cam planar groove 504, even when an axial reaction force is applied from the clutch 70, which is in the coupled state, to the driven cam 50, the ball 3 is not rolled. Therefore, the drive cam 40 is not rotated relative to the driven cam 50. Thus, even when the energization of the electric motor 20 is stopped at this time, the clutch 70 can be kept in the coupled state. Therefore, the electric power consumption of the clutch device 1 can be reduced.

Fourth Embodiment

Figure 13:
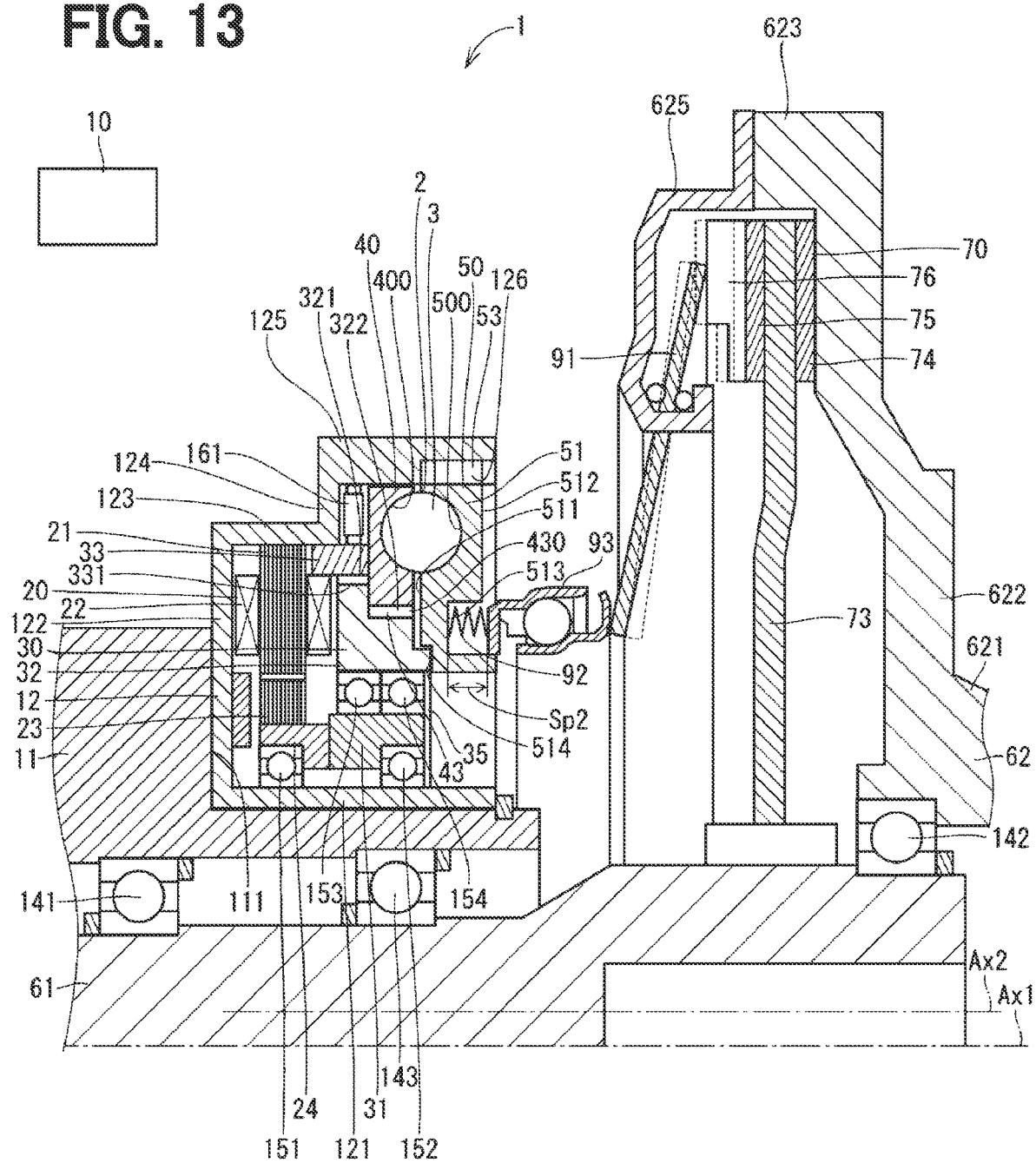
FIG. 13 is a cross-sectional view of a clutch device according to a fourth embodiment.

FIG. 13 indicates a clutch device according to a fourth embodiment. The fourth embodiment differs from the first embodiment with respect to the configurations of the clutch and the state shifter.

In the present embodiment, bearings 141, 143 are installed between the inner peripheral wall of the stationary flange 11 and the outer peripheral wall of the input shaft 61. Therefore, the input shaft 61 is rotatably supported by the stationary flange 11 through the bearings 141, 143.

The housing 12 is installed to the stationary flange 11 such that the inner peripheral wall of the inner tubular portion 121 is opposed to an outer peripheral wall of an end part of the stationary flange 11, and the inner bottom portion 122 contacts a stepped surface 111 of the stationary flange 11. The housing 12 is fixed to the stationary flange 11 by bolts (not shown). Here, the housing 12 is coaxial with the stationary flange 11 and the input shaft 61.

Like in the first embodiment, the electric motor 20, the speed reducer 30 and the ball cam 2 are placed at the inside of the outer tubular portions 123, 125 of the housing 12. Like in the first embodiment, the drive cam 40 is placed at the inside of the outer tubular portion 125 (serving as the tubular portion) of the housing 12 on the side of the ring gear 33, which is opposite to the stator 21, such that the drive cam internal teeth 43 of the ring gear 430 are meshed with the secondary external teeth 322 of the planetary gear 32.

In the present embodiment, the output shaft 62 includes the shaft portion 621, the plate portion 622, the tubular portion 623 and a cover 625. The shaft portion 621 is shaped generally in the cylindrical tubular form. The plate portion 622 is formed integrally with the shaft portion 621 in one-piece such that the plate portion 622 is shaped in the ring plate form and radially outwardly extends from the one end of the shaft portion 621. The tubular portion 623 is formed integrally with the plate portion 622 such that the tubular portion 623 is shaped generally in the cylindrical tubular form and extends from the outer peripheral part of the plate portion 622 toward the side that is opposite to the shaft portion 621. The output shaft 62 is rotatably supported by the input shaft 61 through the bearing 142.

The clutch 70 includes a support portion 73, friction plates 74, 75 and a pressure plate 76. The support portion 73 is located on a side of the plate portion 622 of the output shaft 62, at which the driven cam 50 is placed. The support portion 73 is shaped generally in a circular ring plate form and radially outwardly extends from an outer peripheral wall of an end part of the input shaft 61.

The friction plate 74 is shaped generally in a circular ring plate form and is installed to a side of an outer peripheral part of the support portion 73 where the plate portion 622 of the output shaft 62 is placed. The friction plate 74 is fixed to the support portion 73. The friction plate 74 can contact the plate portion 622 when the outer peripheral part of the support portion 73 is deformed toward the plate portion 622.

The friction plate 75 is shaped generally in a circular ring plate form and is installed to another side of the outer peripheral part of the support portion 73, which is opposite to the plate portion 622 of the output shaft 62. The friction plate 75 is fixed to the support portion 73.

The pressure plate 76 is shaped generally in a circular ring plate form and is located on a side of the friction plate 75 where the driven cam 50 is placed.

In a coupled state where the friction plate 74 and the plate portion 622 contact with each other, i.e., are coupled with each other, a frictional force is generated between the friction plate 74 and the plate portion 622, and relative rotation between the friction plate 74 and the plate portion 622 is limited according to the amount of this frictional force. In contrast, in a decoupled state where the friction plate 74 and the plate portion 622 are spaced from each other, i.e., are decoupled from each other, the frictional force is not generated between the friction plate 74 and the plate portion 622, and thereby relative rotation between the friction plate 74 and the plate portion 622 is not limited.

In the coupled state of the clutch 70, the torque, which is inputted to the input shaft 61, is transmitted to the output shaft 62 through the clutch 70. In contrast, in the decoupled state of the clutch 70, the torque, which is inputted to the input shaft 61, is not transmitted to the output shaft 62.

The cover 625 is shaped generally in a circular ring form and is installed to the tubular portion 623 of the output shaft 62 such that the cover 625 covers a side of the pressure plate 76, which is opposite to the friction plate 75.

In the present embodiment, the clutch device 1 includes a diaphragm spring 91, which serves as the state shifter, in place of the piston 81. The diaphragm spring 91 is shaped generally in a circular ring form and is installed to the cover 625 such that an outer peripheral part of the diaphragm spring 91 contacts the pressure plate 76. The outer peripheral part of the diaphragm spring 91 is located on a side of an inner peripheral part of the diaphragm spring 91 where the clutch 70 is placed, and an intermediate part of the diaphragm spring 91, which is located between the outer peripheral part and the inner peripheral part of the diaphragm spring 91, is supported by the cover 625. Furthermore, the diaphragm spring 91 urges the pressure plate 76 toward the friction plate 75 through the outer peripheral part of the diaphragm spring 91. Thus, the pressure plate 76 is urged against the friction plate 75, and the friction plate 74 is urged against the plate portion 622. Specifically, the clutch 70 is normally placed in the coupled state.

In the present embodiment, the clutch device 1 is a normally closed type clutch device that is normally placed in the coupled state.

In the present embodiment, a return spring 92 and a release bearing 93 are provided in place of the return spring 82, the retaining portion 83 and the thrust bearing 162.

The return spring 92 is, for example, a coil spring and is installed in a recess 513 that is shaped in an annular form and is recessed at a surface of the driven cam 50, which is opposite to the drive cam 40.

The release bearing 93 is placed between the return spring 92 and the inner peripheral part of the diaphragm spring 91. The return spring 92 urges the release bearing 93 toward the diaphragm spring 91. The release bearing 93 rotatably supports the diaphragm spring 91 while the release bearing 93 receives a load from the diaphragm spring 91 in a thrust direction. The urging force of the return spring 92 is smaller than the urging force of the diaphragm spring 91.

As shown in FIG. 13, in a state where each of the balls 3 is placed at the deepest point of the drive cam groove 400 and the deepest point of the driven cam groove 500, a distance between the drive cam 40 and the driven cam 50 is relatively small, and a gap Sp2 is formed between the release bearing 93 and a bottom of the recess 513 of the driven cam 50. Thus, the friction plate 74 is urged against the plate portion 622 by the urging force of the diaphragm spring 91, and the clutch 70 is placed in the coupled state so that the transmission of the torque between the input shaft 61 and the output shaft 62 is enabled.

When the electric power is supplied to the coil 22 of the electric motor 20 through the control operation of the ECU 10, the electric motor 20 is rotated. Thereby, the torque is outputted from the speed reducer 30, and the drive cam 40 is rotated relative to the housing 12. Thus, each of the balls 3 is rolled along the corresponding drive cam groove 400 and the corresponding driven cam groove 500. As a result, the driven cam 50 is axially moved relative to the drive cam 40, i.e., is moved toward the clutch 70. Thereby, the gap Sp2 between the release bearing 93 and the recess 513 of the driven cam 50 is reduced, and the return spring 92 is compressed in the axial direction between the driven cam 50 and the release bearing 93.

When the driven cam 50 is further moved toward the clutch 70, the return spring 92 is compressed to its maximum amount, so that the release bearing 93 is urged toward the clutch 70 by the driven cam 50. Thus, the release bearing 93 urges the inner peripheral part of the diaphragm spring 91 and is moved toward the clutch 70 against a reaction force applied from the diaphragm spring 91.

When the release bearing 93 urges the inner peripheral part of the diaphragm spring 91 and is moved toward the clutch 70, the inner peripheral part of the diaphragm spring 91 is moved toward the clutch 70, and the outer peripheral part of the diaphragm spring 91 is moved toward the side that is opposite to the clutch 70. Thereby, the friction plate 74 is spaced away from the plate portion 622, and the operational state of the clutch 70 is changed from the coupled state to the decoupled state. As a result, the transmission of the torque between the input shaft 61 and the output shaft 62 is disabled.

When the clutch transmission torque becomes 0 (zero), the ECU 10 stops the rotation of the electric motor 20. Thus, the operational state of the clutch 70 is maintained in the decoupled state. As described above, the diaphragm spring 91 can receive the axial force from the driven cam 50 to change the operational state of the clutch 70 to the coupled state or the decoupled state according to the axial position of the driven cam 50 relative to the drive cam 40.

Like in the first embodiment, the clutch 70 is placed on the side of the driven cam 50, which is opposite to the drive cam 40, and the clutch 70 changes the operational state thereof to the coupled state or the decoupled state according to the axial position of the driven cam 50 relative to the drive cam 40.

The configurations of each drive cam groove 400 and each driven cam groove 500 are the same as those of the first embodiment and are thereby not described for the sake of simplicity.

As shown in FIG. 13, in the present embodiment, like in the first embodiment, at least a part of each drive cam groove 400 overlaps with the speed reducer 30 in the axial direction of the drive cam 40.

Specifically, each drive cam groove 400 entirely overlaps with the ring gear 430 (serving as the output member), which is the portion of the speed reducer 30, in the axial direction of the drive cam 40. Thereby, the size of the clutch device 1, which is measured in the axial direction of the drive cam 40, can be reduced or minimized.

In the present embodiment, the speed reducer 30 further includes an extending portion 35 in place of the limiting portion 34. The extending portion 35 is formed integrally with the planetary gear 32 in one-piece such that the extending portion 35 is shaped in a tubular form and extends from an axial end surface of the planetary gear 32, which is located on the clutch 70 side, toward the clutch 70. An inner peripheral wall of the extending portion 35 is engaged with the outer peripheral wall of the bearing 154. The driven cam 50 further includes a recess 514. The recess 514 is shaped in a circular form and is recessed from an inner peripheral part of the one end surface 511 of the driven cam main body 51, which is located on the drive cam 40 side, toward the clutch 70. An end part of the extending portion 35, which is located on the clutch 70 side, is placed at an inside of the recess 514.

Here, each drive cam groove 400 entirely overlaps with the planetary gear 32 (the portion of the speed reducer 30), particularly with the secondary external teeth 322 of the planetary gear 32 in the axial direction of the drive cam 40.

Furthermore, an axial part of the extending portion 35 of the speed reducer 30 is located on the radially inner side of the driven cam grooves 500 of the driven cam 50. Specifically, in the present embodiment, at least a portion of each driven cam groove 500 overlaps with the extending portion 35 (the portion of the speed reducer 30) in the axial direction of the driven cam 50. Thereby, the size of the clutch device 1, which is measured in the axial direction of the drive cam 40 and the driven cam 50, can be reduced or minimized.

The rest of the present embodiment, which is other than the above described points, is the same as that of the first embodiment.

As described above, the present disclosure can be applied to the normally closed type clutch device. In the present embodiment, the maximum translational force, which is substantially the same as the maximum translational force generated by the electric motor 20 at the normal time, can be generated even with the reduced output torque that is outputted from the electric motor 20, in which the winding set of the one system is broken. Thus, the normally closed type clutch 70 can be fully opened.

Other Embodiments

In another embodiment, as long as the slope angle of the groove bottom 403 of the emergency-time drive cam groove 402 is smaller than the slope angle of the groove bottom 403 of the normal-time drive cam groove 401, the ratio between the tangent value of the slope angle of the groove bottom 403 relative to the circumferential movement distance DMd2 from the drive cam specific point PSd1 at the emergency-time drive cam groove 402 and the tangent value of the slope angle of the groove bottom 403 relative to the circumferential movement distance DMd1 from the drive cam specific point PSd1 at the normal-time drive cam groove 401 may not be 1:2. However, if this ratio is 1/2 or less, a useless rotational angle may exist in the drive cam 40, and the design restrictions in the rotational direction may possibly increase. Therefore, it is desirable that this ratio is 1:2.

Furthermore, the ratio between the circumferential angular extent θd2 of the entire locus of the emergency-time drive cam groove 402 and the circumferential angular extent θd1 of the entire locus of the normal-time drive cam groove 401 may not be 2:1. However, if this ratio is 2 or more, a useless rotational angle may exist in the drive cam 40, and the design restrictions in the rotational direction may possibly increase. Therefore, it is desirable that this ratio is 2:1.

Furthermore, as long as the slope angle of the groove bottom 503 of the emergency-time driven cam groove 502 is smaller than the slope angle of the groove bottom 503 of the normal-time driven cam groove 501, the ratio between the tangent value of the slope angle of the groove bottom 503 relative to the circumferential movement distance DMv2 from the driven cam specific point PSv1 at the emergency-time driven cam groove 502 and the tangent value of the slope angle of the groove bottom 503 relative to the circumferential movement distance DMv1 from the driven cam specific point PSv1 at the normal-time driven cam groove 501 may not be 1:2. However, if this ratio is 1/2 or less, a useless rotational angle may exist in the driven cam 50, and the design restrictions in the rotational direction may possibly increase. Therefore, it is desirable that this ratio is 1:2.

Furthermore, the ratio between the circumferential angular extent θv2 of the entire locus of the emergency-time driven cam groove 502 and the circumferential angular extent θv1 of the entire locus of the normal-time driven cam groove 501 may not be 2:1. However, if this ratio is 2 or more, a useless rotational angle may exist in the driven cam 50, and the design restrictions in the rotational direction may possibly increase. Therefore, it is desirable that this ratio is 2:1.

Furthermore, in the second embodiment, there is described the example where the emergency-time drive cam groove 402 is formed such that the distance between the center Od1 of the drive cam 40 and the groove bottom 403 at the emergency-time drive cam groove 402 continuously decreases from the one side toward the other side in the circumferential direction of the drive cam 40, and the emergency-time driven cam groove 502 is formed such that the distance between the center Ov1 of the driven cam 50 and the groove bottom 503 at the emergency-time driven cam groove 502 continuously decreases from the one side toward the other side in the circumferential direction of the driven cam 50. Alternatively, in another embodiment, the emergency-time drive cam groove 402 may be formed such that the distance between the center Od1 of the drive cam 40 and the groove bottom 403 at the emergency-time drive cam groove 402 continuously increases from the one side toward the other side in the circumferential direction of the drive cam 40, and the emergency-time driven cam groove 502 may be formed such that the distance between the center Ov1 of the driven cam 50 and the groove bottom 503 at the emergency-time driven cam groove 502 continuously increases from the one side toward the other side in the circumferential direction of the driven cam 50.

Furthermore, in the third embodiment, there is described the example where the drive cam planar groove 404 extends in the circumferential direction of the drive cam 40 from the end of the normal-time drive cam groove 401, which is opposite to the drive cam specific point PSd1, and driven cam planar groove 504 extends in the circumferential direction of the driven cam 50 from the end of the normal-time driven cam groove 501, which is opposite to the driven cam specific point PSv1. Alternatively, in another embodiment, the drive cam planar groove 404 may extend in the circumferential direction of the drive cam 40 from an end of the emergency-time drive cam groove 402, which is opposite to the drive cam specific point PSd1, and the driven cam planar groove 504 may extend in the circumferential direction of the driven cam 50 from an end of the emergency-time driven cam groove 502, which is opposite to the driven cam specific point PSv1.

Furthermore, in another embodiment, the number of the drive cam grooves 400, the number of the driven cam grooves 500 are not necessarily limited to three and may be changed to four or more. Furthermore, the number of the balls 3 is not necessarily limited to three and may be changed to four or more according to the number of the drive cam grooves 400 and the number of the driven cam grooves 500.

Furthermore, in the above embodiments, there is described the example where the ball 3, which is shaped in the spherical form, is used as the rolling element placed between the drive cam 40 and the driven cam 50. Alternatively, in another embodiment, the rolling element is not necessarily limited to the spherical form, and a roller, which is shaped in a cylindrical form, may be used as the rolling element.

Furthermore, the present disclosure is not necessarily applied to the vehicle driven by the drive torque generated from the internal combustion engine and may be applied to an electric vehicle or a hybrid vehicle that can travel with drive torque generated from an electric motor.

Furthermore, in another embodiment, the torque may be inputted from the second transmitter, and the torque may be outputted from the first transmitter through the clutch. Furthermore, in a case where one of the first transmitter and the second transmitter is non-rotatably fixed, rotation of the other one of the first transmitter and the second transmitter can be stopped by placing the clutch in the coupled state. In such a case, the clutch device may be used as a brake device.

As described above, the present disclosure is not necessarily limited to the above-described embodiments and may be implemented in various forms without departing from the gist thereof.

The present disclosure has been described based on the embodiments. However, the present disclosure is not necessarily limited to the embodiments and structures described therein. The present disclosure also covers various modifications of the above embodiments and modifications within an equivalent range. Further, various combinations and forms, and other combinations and forms including only one element, more, or less than them are also within the scope and spirit of the present disclosure.

What is claimed is:

1. A clutch device comprising:
   a first transmitter;
   a drive device that includes two winding sets and is configured to output torque through energization of the two winding sets;
   a drive cam that has a plurality of drive cam grooves formed at one end surface of the drive cam, wherein the drive cam is configured to be rotated by the torque outputted from the drive device;
   a plurality of rolling elements that are rotatably installed in the plurality of drive cam grooves, respectively;
   a driven cam that has a plurality of driven cam grooves formed at one end surface of the driven cam while each of the plurality of rolling elements is clamped between a corresponding one of the plurality of drive cam grooves and a corresponding one of the plurality of driven cam grooves, wherein the driven cam cooperates with the drive cam and the plurality of rolling elements to form a rolling element cam, and when relative rotation is made between the driven cam and the drive cam, the driven cam is moved relative to the drive cam in an axial direction;

a second transmitter that is configured to transmit the torque between the first transmitter and the second transmitter; and a clutch that is configured to shift an operational state of the clutch to a coupled state or a decoupled state depending on a relative position of the driven cam relative to the drive cam in the axial direction, wherein the clutch is configured to enable transmission of the torque between the first transmitter and the second transmitter through the clutch in the coupled state and disable the transmission of the torque between the first transmitter and the second transmitter through the clutch in the decoupled state, wherein:

each of the plurality of drive cam grooves includes:

a normal-time drive cam groove that extends from a corresponding drive cam specific point, which is defined as a specific point of the drive cam, toward one side in a circumferential direction of the drive cam, wherein a groove bottom at the normal-time drive cam groove is sloped relative to the one end surface of the drive cam such that a depth of the groove bottom continuously decreases from the corresponding drive cam specific point toward the one side in the circumferential direction of the drive cam; and an emergency-time drive cam groove that extends from the corresponding drive cam specific point toward another side in the circumferential direction of the drive cam, wherein the groove bottom at the emergency-time drive cam groove is sloped relative to the one end surface of the drive cam such that the depth of the groove bottom continuously decreases from the corresponding drive cam specific point toward the another side in the circumferential direction of the drive cam, and a slope angle of the groove bottom of each of the plurality of drive cam grooves relative to the one end surface of the drive cam is set such that the slope angle of the groove bottom at the emergency-time drive cam groove is smaller than the slope angle of the groove bottom at the normal-time drive cam groove; and each of the plurality of driven cam grooves includes:

a normal-time driven cam groove that extends from a corresponding driven cam specific point, which is defined as a specific point of the driven cam, toward one side in a circumferential direction of the driven cam, wherein a groove bottom at the normal-time driven cam groove is sloped relative to the one end surface of the driven cam such that a depth of the groove bottom continuously decreases from the corresponding driven cam specific point toward the one side in the circumferential direction of the driven cam; and an emergency-time driven cam groove that extends from the corresponding driven cam specific point toward another side in the circumferential direction of the driven cam, wherein the groove bottom at the emergency-time driven cam groove is sloped relative to the one end surface of the driven cam such that the depth of the groove bottom continuously decreases from the corresponding driven cam specific point toward the another side in the circumferential direction of the driven cam, and a slope angle of the groove bottom of each of the plurality of driven cam grooves relative to the one end surface of the driven cam is set such that the slope angle of the groove bottom at the emergency-time driven cam groove is smaller than the slope angle of the groove bottom at the normal-time driven cam groove.

2. The clutch device according to claim 1, further comprising a controller that is configured to control the energization of the two winding sets to control an operation of the drive device, wherein:

the controller is configured to control the operation of the drive device such that each of the plurality of rolling elements is rolled along the normal-time drive cam groove of the corresponding one of the plurality of drive cam grooves and the normal-time driven cam groove of the corresponding one of the plurality of driven cam grooves at a normal time, during which none of the two winding sets is broken; and the controller is configured to control the operation of the drive device such that each of the plurality of rolling elements is rolled along the emergency-time drive cam groove of the corresponding one of the plurality of drive cam grooves and the emergency-time driven cam groove of the corresponding one of the plurality of driven cam grooves at an emergency time, during which one of the two winding sets is broken.

3. The clutch device according to claim 1, wherein:

in each of the plurality of drive cam grooves, a ratio between a tangent value of the slope angle of the groove bottom relative to a circumferential movement distance from the corresponding drive cam specific point at the emergency-time drive cam groove and a tangent value of the slope angle of the groove bottom relative to a circumferential movement distance from the corresponding drive cam specific point at the normal-time drive cam groove is 1:2; and in each of the plurality of driven cam grooves, a ratio between a tangent value of the slope angle of the groove bottom relative to a circumferential movement distance from the corresponding driven cam specific point at the emergency-time driven cam groove and a tangent value of the slope angle of the groove bottom relative to a circumferential movement distance from the corresponding driven cam specific point at the normal-time driven cam groove is 1:2.

4. The clutch device according to claim 1, wherein:

in each of the plurality of drive cam grooves, a ratio between a circumferential angular extent of an entire locus of the emergency-time drive cam groove and a circumferential angular extent of an entire locus of the normal-time drive cam groove is 2:1; and in each of the plurality of driven cam grooves, a ratio between a circumferential angular extent of an entire locus of the emergency-time driven cam groove and a circumferential angular extent of an entire locus of the normal-time driven cam groove is 2:1.

5. The clutch device according to claim 1, wherein:

the emergency-time drive cam groove in each of the plurality of drive cam grooves is formed such that a distance between a center of the drive cam and the groove bottom at the emergency-time drive cam groove continuously changes from the one side toward the another side in the circumferential direction of the drive cam; and the emergency-time driven cam groove in each of the plurality of driven cam grooves is formed such that a distance between a center of the driven cam and the groove bottom at the emergency-time driven cam groove continuously changes from the one side toward the another side in the circumferential direction of the driven cam.

6. The clutch device according to claim 1, wherein:

each of the plurality of drive cam grooves has a drive cam planar groove that extends in the circumferential direction of the drive cam from an end of one of the normal-time drive cam groove and the emergency-time drive cam groove, which is opposite to the corresponding drive cam specific point, while the groove bottom at the drive cam planar groove is parallel to the one end surface of the drive cam such that the depth of the groove bottom is constant in the circumferential direction of the drive cam; and each of the plurality of driven cam grooves has a driven cam planar groove that extends in the circumferential direction of the driven cam from an end of one of the normal-time driven cam groove and the emergency-time driven cam groove, which is opposite to the corresponding driven cam specific point, while the groove bottom at the driven cam planar groove is parallel to the one end surface of the driven cam such that the depth of the groove bottom is constant in the circumferential direction of the driven cam.

* * * * *